United States Patent
Matsumoto et al.

[15] 3,646,613
[45] Feb. 29, 1972

[54] AUTOMATIC CARRYING SYSTEM

[72] Inventors: Mikio Matsumoto, Ashiya-shi, Hyogo-ken; Kenji Terada, Sumiyoshi-ku, Osaka; Mitsuru Matsunaga, Neyagawa-shi, Osaka, all of Japan

[73] Assignee: The Tsubakimoto Chain Mfg. Co., Ltd., Osaka, Japan

[22] Filed: Oct. 21, 1968

[21] Appl. No.: 769,320

[30] Foreign Application Priority Data

Oct. 31, 1967    Japan.................................42/69578

[52] U.S. Cl..................................104/149, 104/94, 104/98, 104/132
[51] Int. Cl.........................................................B61b 3/02
[58] Field of Search.................104/153, 94, 48, 96, 98, 102, 104/132, 152, 148, 149, 100; 235/92; 246/182 R, 63 A; 212/18, 22

[56] References Cited

UNITED STATES PATENTS

| | | | |
|---|---|---|---|
| 2,509,788 | 5/1950 | Smith | 104/48 |
| 2,902,945 | 9/1959 | Simon | 104/153 X |
| 3,379,863 | 4/1968 | Werts | 235/92 |
| 3,418,949 | 12/1968 | Fromme et al. | 104/178 X |
| 1,517,707 | 12/1924 | Castleman | 104/128 X |
| 2,688,934 | 9/1954 | Quail | 104/98 X |
| 3,514,756 | 5/1970 | Duteil | 246/63 A X |

FOREIGN PATENTS OR APPLICATIONS 295,120    8/1928    Great Britain.........................104/172

Primary Examiner—Drayton E. Hoffman
Assistant Examiner—George H. Libman
Attorney—Wenderoth, Lind & Ponack

[57] ABSTRACT

An automatic carrying system for carrying loads from any place to any location along particular formed rails provided with power supply lines. This system includes an automatic carrying apparatus adapted to run on the rail with loads to be conveyed, a section control apparatus for controlling the operation of the carrying apparatus so as not to permit the successive carrying apparatus to collide each other, a branching and joining apparatus for the carrying apparatus, a turnable directioning apparatus for turning the direction of the carrying apparatus, and accessories for controlling the operation of the carrying apparatus.

3 Claims, 54 Drawing Figures

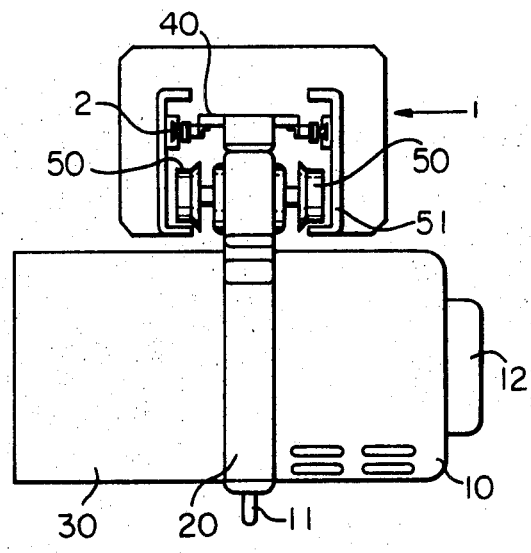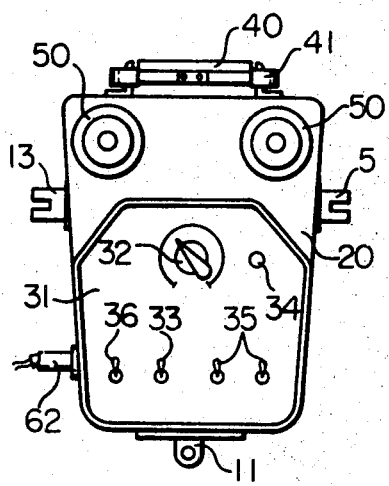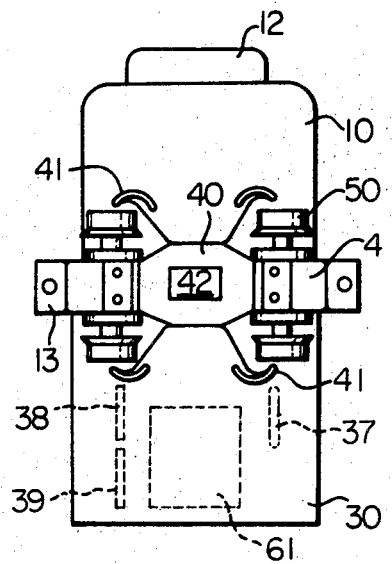

MIKIO MATSUMOTO,
KENJI TERADA AND
MITSURU MATSUNAGA,
INVENTORS

MIKIO MATSUMOTO,
KENJI TERADA AND
MITSURU MATSUNAGA,
INVENTORS

MIKIO MATSUMOTO,
KENJI TERADA AND
MITSURU MATSUNAGA,
INVENTORS

MIKIO MATSUMOTO,
KENJI TERADA AND
MITSURU MATSUNAGA,
INVENTORS

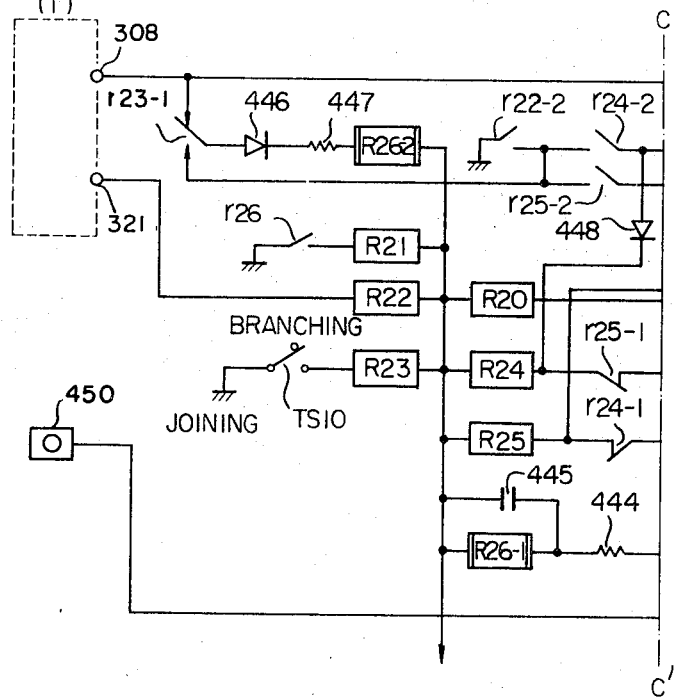
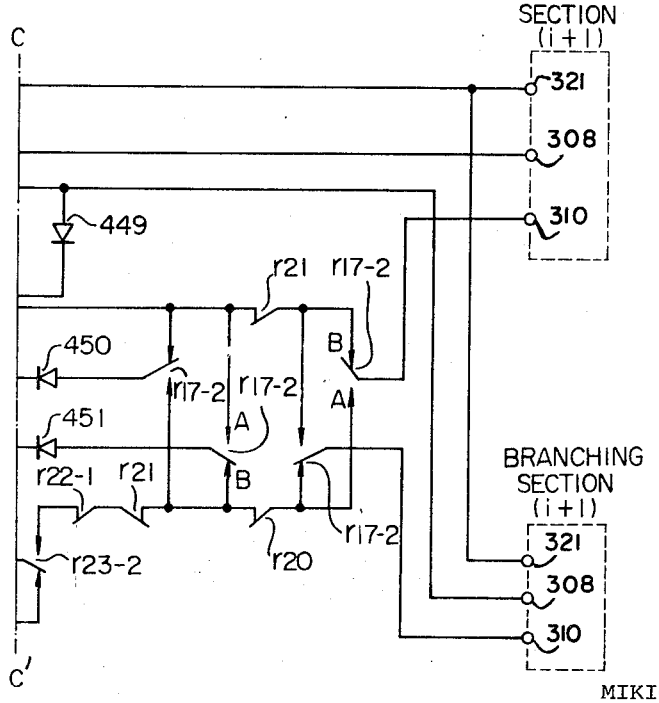
Fig. 11D

|       | (111) 000 | (110) 001 | (101) 010 | (100) 011 | (011) 100 | (010) 101 | (001) 110 | (000) 111 |
|-------|-----------|-----------|-----------|-----------|-----------|-----------|-----------|-----------|
| 000   | 111       | 110       | 101       | 100       | -011      | -010      | -001      | -000      |
| 001   | -000      | 111       | 110       | 101       | 100       | -011      | -010      | -001      |
| 010   | -001      | -000      | 111       | 110       | 101       | 100       | -011      | -010      |
| 011   | -010      | -001      | -000      | 111       | 110       | 101       | 100       | -011      |
| 100   | -011      | -010      | -001      | -000      | 111       | 110       | 101       | 100       |
| 101   | -100      | -001      | -010      | -001      | -000      | 111       | 110       | 101       |
| 110   | -101      | -100      | -011      | -010      | -001      | -000      | 111       | 110       |
| 111   | -110      | -101      | -100      | -011      | -010      | -001      | -000      | 111       |

Fig. 13F

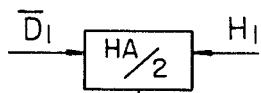

$$C_1 = \overline{D}_1 H_1$$

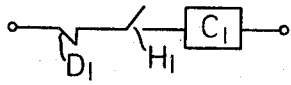

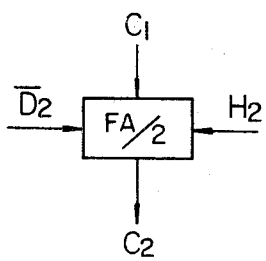

$$C_2 = H_2\overline{D}_2 + C_1(H_2 D_2 + \overline{H}_2\overline{D}_2)$$
$$= H_2\overline{D}_2 + C_1 H_2 D_2 + C_1 \overline{H}_2\overline{D}_2$$
$$= H_2(\overline{D}_2 + C_1 D_2) + C_1 \overline{H}_2\overline{D}_2$$
$$= H_2(\overline{D}_2 + C_1) + C_1 \overline{H}_2\overline{D}_2$$
$$= \overline{D}_2(H_2 + C_1\overline{H}_2) + H_2 C_1$$
$$= \overline{D}_2 H_2 + \overline{D}_2 C_1 + H_2 C_1$$

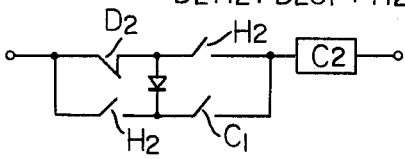

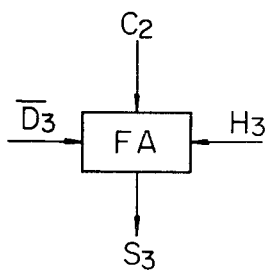

$$S_3 = (\overline{H}_3\overline{D}_3 + H_3 D_3)\overline{C}_2 + \overline{(\overline{H}_3\overline{D}_3 + H_3 D_3)} C_2$$
$$\quad = \quad \text{''} \quad\quad + (\overline{\overline{H}_3\overline{D}_3})(\overline{H_3 D_3}) C_2$$
$$\quad = \quad \text{''} \quad\quad + (H_3 + D_3)(\overline{H}_3 + \overline{D}_3) C_2$$
$$\quad = \quad \text{''} \quad\quad + (H_3\overline{D}_3 + D_3\overline{H}_3) C_2$$
$$= \overline{D}_3(\overline{H}_3\overline{C}_2 + H_3 C_2) + D_3(H_3\overline{C}_2 + \overline{H}_3 C_2)$$

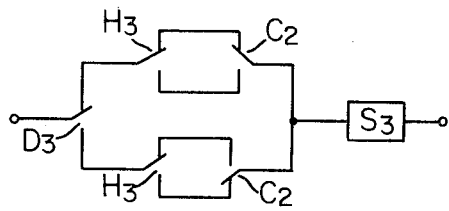

MIKIO MATSUMOTO,
KENJI TERADA AND
MITSURU MATSUNAGA,
INVENTORS

MIKIO MATSUMOTO,
KENJI TERADA AND
MITSURU MATSUNAGA,
INVENTORS

AUTOMATIC CARRYING SYSTEM

BACKGROUND OF THE INVENTION

1. Field of the Invention

This invention relates generally to an automatic carrying system for carrying loads from any point to a destination along a predetermined route under the control of an internal or external control device.

2. Description of the Prior Art

Heretofore, various chain conveyors or belt conveyors have been used for the purpose of carrying loads as well as for linear production lines between various operational process to raise the efficiency of production. However, in such conveyor systems, since conveyor belts are driven by a continuous drive belt, the speed at which loads are carried cannot be varied at any place in a section belonging to the same belt. Also, the prior art conveyor system cannot be used when some articles must be conveyed at a first speed to undergo a first processing operation while other articles must be conveyed at a second speed to undergo a second processing operation. In such case, it has been a conventional solution to divide the conveyors into a required number of sections so that the conveyors belonging to different sections are moved at different speeds, but this solution is very expensive and requires very complicated devices. Also, though the prior art conveyor system can be applied for mass production it cannot be applied for various kinds and quantities of production.

In a chain conveyor system, when once its drive device has gone wrong, the entire system must be stopped, which is not desirable economically. Further, when a load is transported by the chain conveyor, an extremely high noise is generated, and in addition the transporting speed of the load must be limited so as to prevent the load from being subjected to undue vibration.

SUMMARY OF INVENTION

This invention eliminates the above-mentioned disadvantages of the conventional conveyor systems and provides a novel and improved automatic carrying system.

In accordance with this invention an automatic carrying system is provided which comprises rail means having power supply lines contained therein and provided along the operational processes or stages on any place such as floor, ceiling, out of roof, etc., an automatic carrying apparatus having wheels for allowing it to run on the rail with the load hung therefrom under the control of an internal control or external control device, said rails being divided into several sections each having a section control apparatus for preventing relative collision of the carrying apparatuses, a branching and joining apparatus for branching or joining the running carrying apparatus with the load, external start, stop, speed change, forward or reverse instruction devices for controlling the carrying apparatus as required, and a turnable directioning apparatus for turning the direction of movement of the carrying apparatus, whereby the carrying apparatus carries the load along a predetermined or controlled route of the rails at various speeds in each section.

According to one aspect of the present invention, the automatic carrying system has rail means including power supply lines in which the power signal is superposed by control signals; an automatic carrying apparatus for carrying a load along the rail under the control of an external or internal control and including a prime mover, a control device and wheels; a section control apparatus for controlling the motion of the carrying apparatuses so as to prevent the collision of the succeeding carrying apparatus with the preceding carrying apparatus when the carrying apparatus runs, branches, joins or turns; the rail means including an inverted U-shaped frame, a pair of U-shaped rails mounted inside the legs of the frame, a pair of electrically insulated members mounted inside the rails, a pair of power supply lines supported by the members and being L-shaped; the carrying apparatus further including a speed reduction device, collector means for receiving electric power from the lines to supply it to the mover and the control device included therein, control device including switches for predetermining the operation of the carrying apparatus, a speed instruction detector, an operation signal detector, a forward or reverse signal detector and a route-selecting device for the carrying apparatus.

According to another aspect of the present invention, there is provided an automatic carrying system further including a branching and joining apparatus for branching and joining the carrying apparatus including at least three fixed rails disposed at two positions before and after branching positions respectively, at least two movable rails integrally movable perpendicularly to one rail axis, means for moving the movable rail integrally, and control means for controlling the operation of the movable rails, the control means including means for preventing relative collision between the carrying apparatus; a turnable directioning apparatus for turning the advancing direction of the carrying apparatus including a circular turnable table, a rail mounted underneath the table, rollers provided underneath the table, a plurality of wheels externally mounted with respect to the table, and a drive motor for driving the wheels, stoppers for holding the carrying apparatus within the rail, and control means for controlling the turning of the table with respect to the rail, the control means including gate circuit means for setting the turning direction of the carrying apparatus, selector circuit means for selecting the carrying apparatus coming thereto, a directioning instruction device for instructing the direction of the rail therein, an encoder for encoding the directioning instruction, a position detector for detecting the present position of the rail, coincident circuit means for detecting the difference between the coming instruction and present position of the rail, stopper control circuit means for holding the carrying apparatus for the original direction, the control means further including a direction finder for finding the shortest way to turn the carrying apparatus within 180° by using binary codes; a lifting and lowering apparatus for lifting or lowering the carrying apparatus including a fixed rail on which the carrying apparatus runs, a movable rail located between the fixed rails, and a bypassing rail for bypassing other carrying apparatus around the present carrying apparatus. Thus, the load carried by a carrying apparatus may move on along a bypassing route as required without affecting the other loads carried by other carrying apparatus staying at a location. Further, the loads can be branched or joined or even changed in their feeding direction very easily at any speed in each section.

Therefore, one object of this invention is to provide an automatic carrying system for carrying a load from any place to its intended destination through a desired route.

Another object of this invention is to provide an automatic carrying system including an automatic carrying apparatus having a prime mover, and a control device for internally or externally controlling the path of the automatic carrying apparatus to convey loads hung therefrom.

A still further object of this invention is to provide an automatic carrying system for starting, stopping, changing the running speed or direction of the load carrier automatically or externally.

Still another object is to provide an automatic carrying system for preventing the collision of the relative load carrier at any place such as the branching, joining, or turning portion of the load carrier.

Still another object is to provide an automatic carrying system in which a short circuit between the power and the ground is prevented positively.

Still another object is to provide an automatic carrying system in which the load can be carried smoothly by applying a lifting force to the carrying apparatus while it is running along the ascent and braking it while it is running along the descent.

Other objects and advantages of this invention will further become apparent hereinafter, by references to the following description made in conjunction with the accompanying drawings.

BRIEF DESCRIPTION OF THE DRAWINGS

FIG. 1 is a front view of an automatic carrying apparatus embodying the present invention;

FIG. 2 is a side view of the apparatus in FIG. 1;

FIG. 3 is a plan view of the apparatus in FIG. 1;

FIG. 11D is a schematic view of the movable rail control circuit of the branching apparatus;

FIGS. 13C to 13G are data and schematic views of the direction finder of the directioning apparatus control circuit;

DESCRIPTION OF THE PREFERRED EMBODIMENT

An Automatic Carrying Apparatus

Figure 4A:
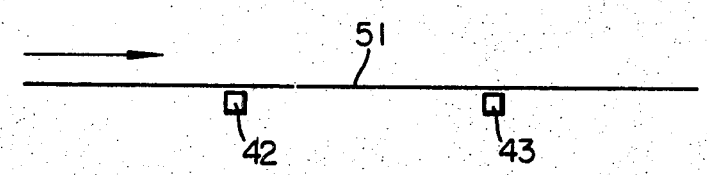
FIGS. 4A to 4C show diagrammatically the operation of the apparatus when it receives a speed instruction signal.

Referring now to FIGS. 1, 2 and 3, an automatic carrying apparatus 1 comprises essentially a prime mover or motor 10, a speed reduction device 20, a control device 30, a collector 40, and rotary wheels 50.

The apparatus 1 is adapted to run on particularly formed rails 51 by means of the wheels 50 under the control of a control device, as will be described in detail hereinafter. The carrying apparatus 1 is provided with a hook 11 for hanging a load through a hoist or the like.

The prime mover 10 may preferably be a variable speed motor such as a single-phase induction motor or a direct current motor, and its speed may be controlled automatically or manually by means of a speed instruction device, a section control device or the control device 30, as will be described in detail hereinafter. A brake 12 is provided at one end of the shaft of the prime mover 10, and may preferably be a spring-locked disc brake. The brake 12 operates to stop or reduce the speed of the mover 10 when required, as will be described hereinafter.

The speed reduction device 20 is connected to the other end of the shaft of the mover 10 and provides for a speed reduction effect between the prime mover 10 and the wheel 50 of the carrying apparatus 1. The speed reduction device 20 may preferably be of chain-controlled three-stage speed reduction type depending upon its requirement.

The control device 30 is mounted opposite to the motor 10 with respect to the reduction device 20 and comprises a speed instruction detector, a forward or reverse switching signal detector, an operation signal detector, power source etc., which control forward and reverse running, stop, switching of running speed, selection of path of the apparatus 1, and switching between automatic and manual operations, as will be described hereinafter.

The collector 40 includes contact members for conducting the power for the prime mover from power supply lines 2 respectively contained within the particular rails 51 of this invention as will be described hereinafter.

Each rotary wheel 50 has a flange and may be made of steel but is preferably made of synthetic rubber for preventing generation of noise or for preventing slip while the carrying apparatus 1 is running up a steep slope. The rotating device force of the mover 10 is increased in its torque in the speed reduction device 20 and thence transmitted to the movable wheel 50 so that the apparatus 1 runs on the rails 51 with a load.

Referring now to FIG. 2, on a panel 31 of the control device 30 provided selected ones of a path- or route-selecting switch 32, a speed-selecting switch 33, a power indicator 34, an operation switch 35, and a brake switch 36 in accordance with the control requirement.

The path-selecting switch 32 predetermines the path to be followed by the apparatus 1 when it reaches a branching portion as, will be described hereinafter. The speed-selecting switch 33 selects manually the running speed of the apparatus 1, such as low or high speed. The operation switch 33 is used for switching the operation of the apparatus 1 between automatic and manual modes and also for switching it among forward and reverse running and stop. The brake switch 36 selects either automatic or manual braking operation or release of the braking operation.

Referring now to FIG. 3, the collector 40 may include four contacts 41 extending outwardly and adapted to contact the power supply lines 2 at each rectangular corner of a central upper rectangular plate 42. Contacts 41 may preferably be made of phosphorus bronze and each of them may be made as a leaf spring comprising three phosphorus bronze sheets which are assembled so as to impart a suitable contact pressure against the power supply line 2. Under the upper plate 42 of the collector 40 is provided a permanent magnet so that detectors provided at appropriate positions along the rail may detect magnetically the passage of the apparatus 1 past them.

Also, the control device 30 includes a speed instruction detector 37, an operation signal detector 38, a forward or reverse switching signal detector 39 and a path- or route-selecting device 61 therein, as will be described hereinafter.

The speed instruction detector 37 controls automatically the rotating speed of the rotary wheel 50 when it receives an external speed instruction signal in the form of a magnetic signal for switching the running speed of the apparatus 1, for example, from low to high speed.

The operation signal detector 38 operates to start or stop automatically the apparatus 1 when it receives an external magnetic signal for starting or stopping the apparatus 1.

The forward or reverse signal detector 39 switches the direction of movement of the apparatus 1 to either forward or reverse when it receives a magnetic signal for such switching.

The route selecting device 61 includes a resonant circuit capable of being set at any of a predetermined number of resonant frequencies depending upon the number of branching paths to be selected, and it selects the route of the apparatus 1 or the destination to be reached by the carrying apparatus 1. When the path-selecting device 61 approaches a discriminator including an oscillating circuit oscillating at the same frequency as that of the selecting device 61 and its auxiliary circuit which is mounted along the rails 51, the oscillating circuit stops oscillating because of the absorbing phenomena of the resonant circuit so that a relay is energized to provide a path-selecting signal indicating the route to be followed by the apparatus 1, as will described hereinafter.

Referring back to FIG. 2, a connector 62 is provided at the outside of the control device 30 for permitting transmission of signals and power between the carrying apparatus 1 and a traction device or a trailer when the apparatuses are for such purpose. Alternatively, a manual controller can be connected to this connector 62 for controlling the operations of the apparatus, such as forward, reverse running or stopping. This controller may be a pushbutton-type switch and thus the operation of the carrying apparatus 1 may be controlled by an operator on the ground as done in the operation of a hoist. Fittings 13 are provided for connecting two or more apparatus together.

Figure 4B:
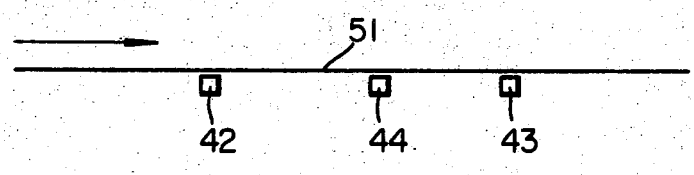
Figure 4C:
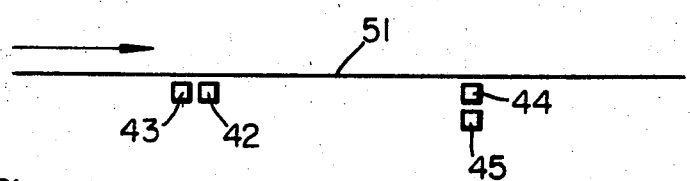

Referring now to FIGS. 4A, 4B and 4C, the control operation of the carrying apparatus 1 will be described in detail.

Referring particularly to FIG. 4A, the apparatus 1 runs on the rails 51 at high speed as indicated by an arrow, and when it passes by the low-speed instruction device 42, the speed instruction detector 37 shown in FIG. 3 is operated so that the speed of the apparatus 1 will be lowered and thereafter maintained at the lower speed. If it passes by the high-speed instruction device 43, the speed thereof will be returned to its high speed.

Referring to FIG. 4B, the apparatus 1 runs on the rails 51 at high speed as indicated by an arrow, and when it passes by the low-speed instruction device 42, the speed thereof will be lowered similarly to that in FIG. 4A. Then, when it passes near the stop instruction device 44, it will stop instantaneously where the load carried by the apparatus may undergo a predetermined process or any other steps. Then, when the stop instruction device 44 is switched to "start," the apparatus 1 will at once start to run at low speed. Or, if the operation switch 35 on the panel 31 of the control device 30 of the apparatus 1 has been switched to "AUTOMATIC," the apparatus 1 will start automatically a predetermined time after it has stopped, which operation will be described in detail hereinafter. When the apparatus 1 passes again beside the high-speed instruction device 43, it will run again at high speed.

Referring to FIG. 4C, when the apparatus 1 passes beside the high-speed instruction device 43 while it is running at high speed on the rail 51 in the direction as indicated by an arrow in the drawing, it will maintain its high speed. Then, when it passes beside the low-speed instruction device 42, it will reduce its speed to low, and when it passes by the stop instruction device 44, it will stop. However, when the apparatus 1 approaches the reverse instruction device 45 near the stop instruction device 44, it receives a reverse instruction signal and detects it and then automatically reverses its running direction and begins to run in a backward direction.

Figure 5:
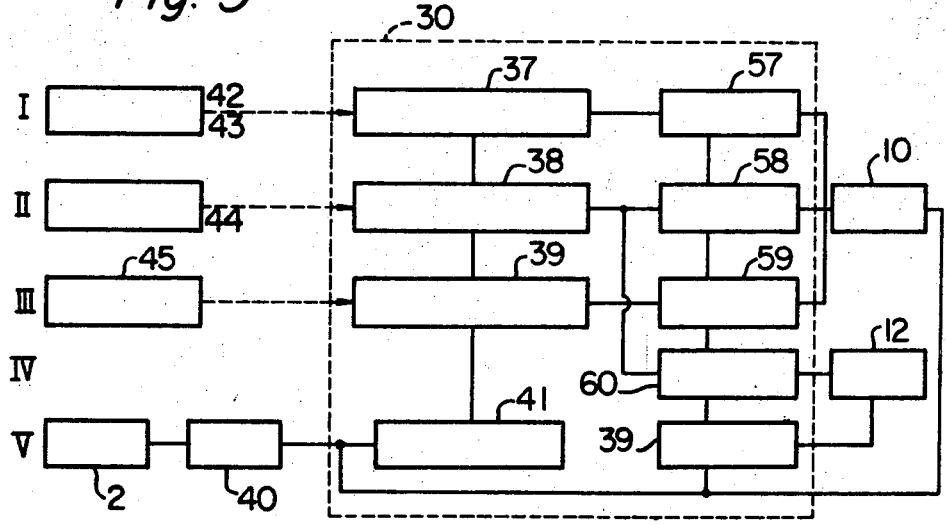
FIG. 5 is a block diagram of the control device employed in the carrying apparatus.

Referring now to FIG. 5, in which a block diagram of the electric circuit of the automatic carrying apparatus 1 is shown, the principle of the operation of the control device of the apparatus 1 will now be explained in detail.

Reference numeral I designates a speed-switching system along a horizontal line, which receives a speed instruction from a speed instruction device, such as low- or high-speed instruction device 42 or 43 mounted at predetermined positions along the rails 51, which produces a low- or high-speed instruction, respectively, as was described before. The speed-switching system comprises a speed instruction detector 37 for detecting the speed instruction, a relay circuit 57 for switching automatically the speed of the prime mover or motor 10 depending upon the instruction received from the speed instruction device through the detector 37.

Reference numeral II designates an operation-switching system, which receives an operation instruction from an operation instruction device, such as start or stop instruction device 44 mounted also at predetermined positions along the rails 51, which produces a start or stop instruction, respectively, as was described before. The operation-switching system comprises an operation signal detector 38 for detecting the operation instruction, and a relay of circuit 58 for automatically starting or stopping the prime mover 10 depending upon the instruction received from the instruction device 44 through the detector 38.

Reference numeral III designates a direction-switching system, which receives a forward or reverse instruction from a reverse instruction device 45 mounted also at predetermined positions along the rails 51, which produces a reverse or forward instruction as was described before. The direction-switching system comprises a forward or reverse signal detector 39 for detecting the forward or reverse signal or instruction, and a relay circuit 59 for reversing automatically the running direction of the prime mover 10 depending upon the instruction received from the instruction device 45 through the detector 39.

Reference numeral IV designates a brake system which comprises a relay circuit 60 which receives a signal from the operation instruction device 44 through the operation signal detector 38 for energizing a brake 12 when it receives the stop instruction and deenergize it when it receives the start instruction for braking or releasing the mover 10.

Reference numeral V designates a power supply system, which comprises a power source (not shown), power supply lines 2 mounted on the rails 51 for supplying electric power to the apparatus 1, a collector 40 for receiving the electric power from the power source through the supply line, rectifying circuits 41, 39 which receive alternate current from the power source through the supply line 2 and collector 40 and which rectify the current so as to supply a direct current to the respective devices and circuits, and the brake. The prime mover 10 receives directly the alternate current in the case of an induction motor and receives the rectified direct current in the case of a DC motor.

Figure 6A:
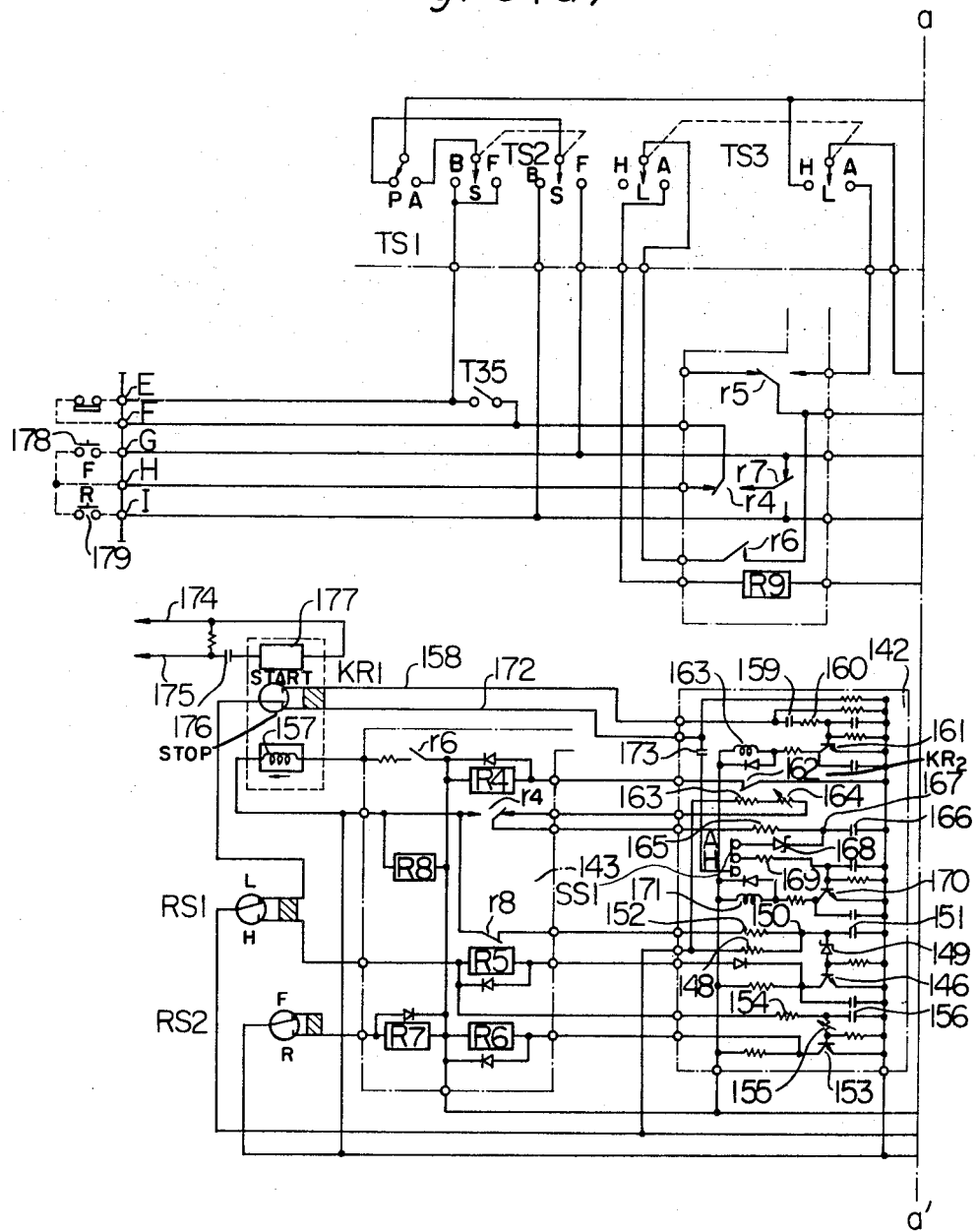
FIG. 6 is an electric wiring diagram of the control device.

Referring now to FIG. 6, in which an electric circuit of the control device of the apparatus 1 is shown, the operation of the circuit will now be described. When the apparatus 1 runs beside the speed instruction device, such as low-speed instruction device 42 on the rail 51, the movable contact of a bistable reed relay RS1, which constitutes said speed instruction detector 37, is switched to "low-speed" side, on the other hand, when the apparatus 1 passes by the high-speed instruction device 43, it is switched to "high-speed" side. The electric power from the source is supplied from the power supply lines 2 through collector 40 and lines 132, 133 to the rectifying circuit 141. A relay R8 is connected between a positive line 144 and a negative line 145 from rectifying circuit 141. While the voltage is applied to the input of the rectifying circuit 141 through a transformer 140, the rectified direct current from the output of the circuit 141 energizes the relay R8, and its contact r8 is opened. Accordingly, the circuit through the output line 145, the contact r8, a resistor 152 and a constant voltage diode 149 to the base of a transistor 146 is open, and the positive voltage is applied from the output line 147 through a resistor 148 and diode 149 to the base of the transistor 146. Thus, the base current flows through the transistor 146 so that the transistor is conductive.

When the movable contact of the reed relay RS1 is transferred to "high-speed" side (lower side of FIG. 6a) as the apparatus approaches the high-speed instruction device, the relay R5 is energized to close its contact r5 at the right side. In this case, if a speed selection switch TS3 is in "automatic" position (that is, the movable arm of the switch TS3 is in contact with the right-hand stationary contact in FIG. 6a) and if either of contacts r1 and r2 of a relay R1 and a relay R2 connected to the powerlines (R1 is used for reverse operation of motor M1, and R2 is used for forward operation of motor M1) has been closed, the current flows through the relay R3 to switch its double contacts r3 to the position opposite to that shown in FIG. 6b, so that the power from the lines 132, 133 will be applied through the respective lower contacts of the double contacts to a main coil 134 and an auxiliary coil 135 for 2p (two poles), which are the coils used to run the motor M1 at high speed.

Figure 6B:
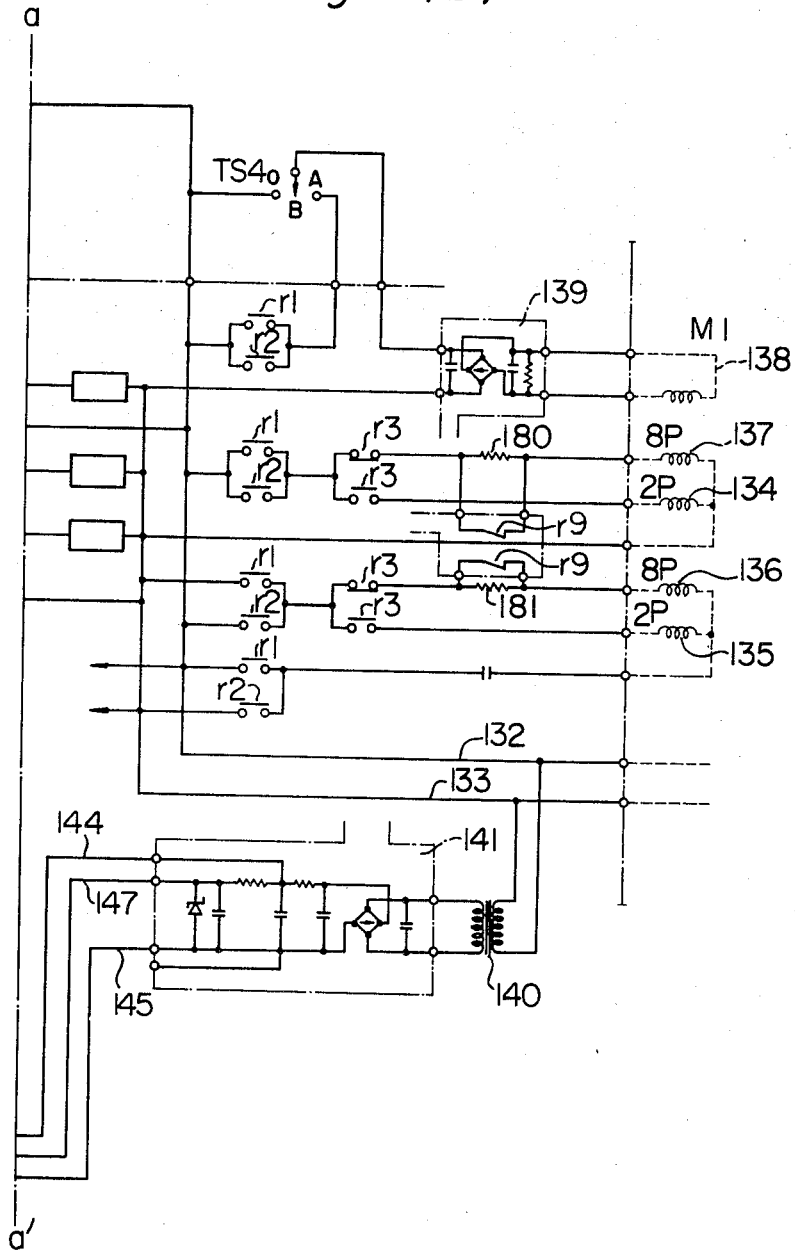

If the speed selector switch TS3 is in "low-speed" position, the current will not flow through the relay R3 so that the contacts r3 are in their positions shown in FIG. 6b, and thus the power from the lines 132, 133 will be applied through the respective upper contacts of the two sets of double contacts r3 to coils for 8p, which are the coils used to run the motor M1 at low when speed selector switch TS3 is in "high speed" so that the powerlines 132, 133 are always connected to the relay R3, the current flows always from the powerlines 132, 133 through the relay R3 so as to maintain the contacts r3 in their positions permitting energization of the coils 134 and 135 similarly to the case when the switch TS3 is in "automatic" position, and accordingly the automatic carrying apparatus 1 runs at high speed.

Now, let us suppose a condition that the reed relay RS1 is in "high-speed" position and that no electric power is supplied to the powerlines 132 and 133, so that the potential at point 150 is zero relative to that of the negative line 145. When an electric power is applied initially through the collector and power supply lines 132 and 133 to a capacitor 151, the potential at said point 150 will increase from zero at a rate corresponding with the time constant determined by a resistor 148 and the capacitor 151, and when it exceeds the potential at the anode of a constant voltage diode 149, such as a Zener diode, the transistor 146 will conduct to energize the relay R5. Thus, when the power is applied again to the circuit included in the carrying apparatus 1 which has been stopped at its "high-speed" mode, the apparatus does not start at high speed from the beginning, but it starts initially at low speed and after a predetermined time period the carrying apparatus 1 will reach the high-speed, thus preventing the load suspended to this apparatus and the apparatus itself from being subjected to a shock at the time of starting. The rate of increase in the speed is dependent upon the time constant determined by the resistor 148, capacitor 151, the voltage of the constant voltage diode 149, the characteristic of the transistor 146, etc.

In this speed-switching system, even though the speed of the apparatus is often switched so that the current is conducted thereto and shut off therefrom repeatedly, there occurs no significantly large change in said rate of increase in speed, since the electric charge on the capacitor 151 is quickly discharged through the resistor 152 and contact r8.

When the reed relay RS1 is switched to "high-speed" position, current will flow through the base of the transistor 153 through resistors 154, 155, so that the transistor will conduct to permit a positive voltage on the line 144 of the rectifying circuit 141 to be applied to the relay R6, thus causing current to flow therethrough, whereby the contact r6 of the relay R6 is closed. In this case, if the speed selector switch TS3 is in "automatic" position, the current from the lines 132, 133 will flow through to relay R9 so as to open the the contact r9 connected in parallel to resistors 180, 181, thus softening the shock to the apparatus.

When the reed relay RS1 is switched from "high-" to "low-speed" position, the contact r5 opens at once so that current flowing through the relay R3 is cut off, thereby the double contacts r3 are switched so that the upper contacts close and the lower contacts open, whereby the motor will run at low speed as was described heretofore. In this case, the current flowing through the resistor 154 is cut off, but the transistor 153 is maintained conductive for a time by virtue of the current to its base which is conducted by the discharge of electric charge on the capacitor 156 through the resistor 155. Accordingly, during a certain period after the switch TS3 has been switched from "low-" to "high-speed" position, the transistor 153 is in the conductive state thereby permitting current to flow through the relay R6 and hence through the relay R9 to open the contact r9, thus mitigating the shock to the apparatus 1 as was described before. This period may be adjusted by a variable resistor 155.

Further, since a voltage from the rectifying circuit 141 is applied through the "low-speed" contact of the switch RS1 to a bistable reed relay KR1, which constitutes said operation signal detector, the apparatus 1 can be stopped only when the relay RS1 is in "low-speed" position. Thus, the apparatus 1 is prevented from stopping quickly while it is running at high-speed in order to avoid the shock to the apparatus.

The stop instruction magnetic signal may preferably have the same polarity as that of the low-speed instruction magnetic signal. The contact r6 of the relay R6 is connected in series with the coil 157 of the reed relay KR1 so as not to stop the apparatus 1 immediately after slowdown of the speed of the apparatus when the apparatus receives the stop instruction, or so as not to stop the apparatus during high-speed operation of the apparatus. Therefore, the apparatus is adapted not to stop until it completely slows down to a slow speed when switched to the low-speed mode.

In the operation-switching system II, when the apparatus passes beside the operation instruction device 44 disposed at a predetermined location along the rail, the operation signal detector 38 contained in the apparatus 1 detects the operation signal therefrom, and it will, for example, stop the carrying apparatus 1 which is running at low speed, if it receives the stop instruction signal.

In FIG. 6, the operation signal detector 38 is constituted by a bistable reed relay KR1 which is adapted to stop the carrying apparatus 1 only when it is running at low speed as was described before.

The stop instruction magnetic signal may have the same polarity as that of the low-speed instruction magnetic signal.

When the apparatus 1 is running at low speed, the contact 162 of the reed relay KR1 is closed to energize the relay R4, thereby the right contact r4 thereof is closed. Supposing that the operation switch TS1 is in "automatic" position, that the operation switch TS2 is in either "forward" or "backward" position and that an interlock switch TS5 is closed, then the relay R2 is energized from the power supply line 132 through the operation switches TS1, TS2, and TS5, contacts r4 and r7, thereby to close its contacts r2 in the circuit of the motor M1, so that the apparatus 1 is permitted to run in either forward or backward direction depending on which contact of the r3 in the motor circuit has been closed. When the apparatus 1 running at high speed passes beside the low-speed instruction device 42, the reed relay RS1 is switched to "low-speed" position so that the relay R5 disposed in the high-speed circuit is deenergized. Then, after a predetermined period the relay R6 is also deenergized, as was previously described, so that its contact r6 opens thereby to deenergize the coil 157 in the reed relay KR1, which is provided for maintaining and interlocking the relay KR1 in its operative state when power is off, and as a result the KR1 is ready to receive the stop instruction for stopping the carrying apparatus 1. In other words, the stop instruction will not effectively actuate the apparatus 1 unless it receives the slow-speed instruction before a predetermined distance from the stop position.

When the apparatus 1 receives a stop instruction, the reed relay KR1 is switched to "stop" side, and the output line 147 of the rectifying circuit 141 is connected through the upper contact of the reed relays RS1, the upper contact of the reed relay KR1, conductor 158 to a capacitor 159 and a resistor 160, thereby the capacitor is charged up. The discharging current from the capacitor flows through the base of a transistor 161 so as to cause it to conduct, whereby current flows through a reed relay coil 163 to open its contact 162. Thus, the relay R4 is deenergized, so that the apparatus 1 stops as was described before. The reed relay contact 162 may be of the bistable type and it remains opened.

A start switch SS1 may be a slide switch adapted to be switched between "MANUAL" position (contact A–H opens) and "AUTOMATIC" position (contact A–H closes) for automatically starting the carrying apparatus 1 after a predetermined period since the apparatus has received a stop instruction. When this start switch SS1 is switched to "AUTOMATIC" position (contact A–H closes), the output line 147 of the rectifier circuit 141 is connected through resistors 163, 164, contact r1, resistor 165 to a capacitor 166 so as to charge up the capacitor 166, whereby the electrical potential on the conductor 167 will gradually increase. When the apparatus stops, the relay R4 is deenergized, as was previously described, so that its contact r4 is switched to the left to close its left contact. Then, when the potential on the conductor 167 increases beyond the potential on Zener diode 168, current flows through the diode 168, switch SS1, resistor 169 and the base of a transistor 170, whereby the transistor will conduct to permit current to flow through the coil of the reed relay 171. Thus, the contact 162 of the reed relay again closes thereby to restart the apparatus 1. This stopping period may be adjusted by a potentiometer 164.

When the start switch is switched to "MANUAL" position (contact A–H opens and lower contact closes), the contact 162 opens, as was previously described, so that the apparatus 1 stops. In order to start the carrying apparatus 1 which has been stopped, the stop instruction is replaced by a start instruction by reversing the polarity of the magnetic signal. Alternatively, if the outer stop instruction is not thereabout, a voltage may be applied to the lines 174, 175 of the reed relay KR1 so as to permit current to flow through the coil 177 of the reed relay for a relatively short time period while a capacitor 176 is charging up so that it switches the contact of the relay KR1 to "start" side (lower contact closes). Then, the voltage from the line 147 of the circuit is applied through the upper contact of the reed relay RS1, the lower contact of the relay KR1, and a conductor 172, to capacitor 173, so that the capacitor 173 is charged up, the transistor 170 conducts, and the coil of the reed relay 171 is energized to close the contact 162 of the reed relay.

In the direction reversing system III, when the apparatus 1 passes beside the reverse instruction device 45 provided at a predetermined position along the rail 51, the reverse signal detector 39 detects the reverse instruction signal such that when it receives a reverse signal it reverses the running direction of the apparatus 1.

In FIG. 6, a bistable reed relay RS2 constitutes said reverse signal detector 39. When the apparatus passes by the reverse instruction device 45 so that the relay RS2 is switched to "reverse" side i.e., when the lower contact of the relay RS2 closes), current flows through the relay R7 so that its contact r7 is switched to "reverse" side. Thus, the relay R1 is energized to close its contact r1, thus reversing the direction of rotation of the prime mover.

When the apparatus is required to reverse its running direction manually, the switch TS1 must be switched to "panel" position and the operation switch TS2 must be switched to "backward" position.

When it is required to remote control the apparatus 1 manually, the operation switch TS1 is pushed and further the relay R4 is maintained deenergized (this means that the carrying apparatus 1 is in its rest state), and then the pushbutton 179 may be pushed in order to start it in the backward direction, or the pushbutton 178 may be pushed in order to start it in the backward direction. This relay R4 serves to prevent a manual signal from entering into the apparatus during automatic operation.

When it is required for the apparatus to be controlled by another trailer apparatus for its operation, a traction switch TS5 may be switched to "OFF" to permit the apparatus 1 to receive an external control signal.

In the brake system IV, when a brake switch TS4 is switched to "open" position, a brake circuit 138 for actuating a brakeshoe (not shown) is energized by a voltage applied through a rectifying circuit 139 to release the brakeshoe. When the brake switch TS4 is switched to "brake" position, a brake circuit 138 is deenergized to brake the wheel. If the switch TS4 is switched to "automatic" position, when the relays R1 and R2 are energized to open their contacts r1 and r2, the brake is deenergized.

SPEED CONTROL SYSTEM

Figure 7A:
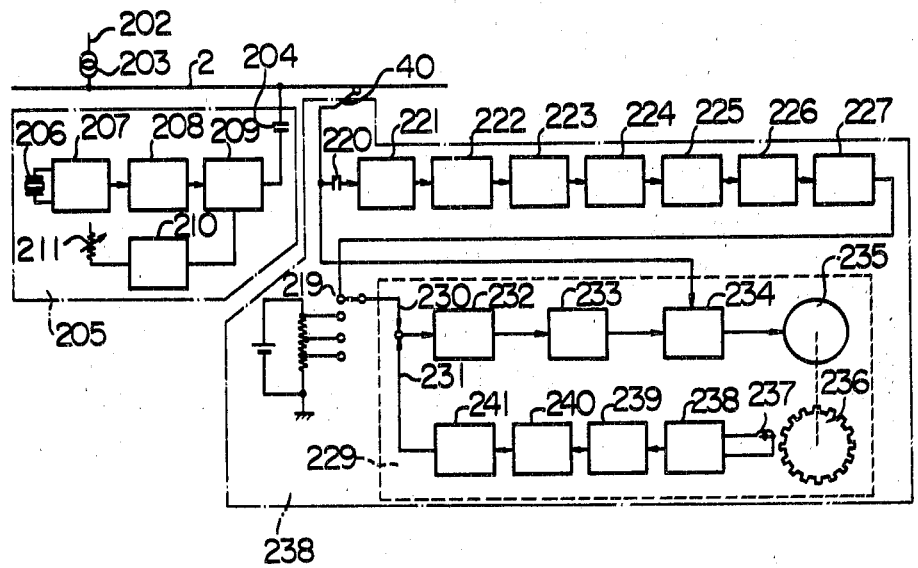
FIG. 7A is a block diagram of a speed control system of the carrying apparatus.

Referring now to FIG. 7A, it shows a block diagram of the system for controlling the speed of the apparatus 1.

A power or voltage supply line 2 contained in a particular shape of rail as will be described hereinafter is supplied with power for running the apparatus through a transformer (not shown) from a line 202.

In this speed control system, there is provided a speed instruction device 205 for superposing the speed instruction signal on the power signal in the power supply line 2 through a capacitor 204. This speed instruction device 205 comprises an oscillating circuit 207 using a crystal 206 for generating a carrier. This carrier is amplified by an amplifier 208, which carrier may have, for example, a waveform as indicated by a numeral 212 in FIG. 7B.

Figure 7B:
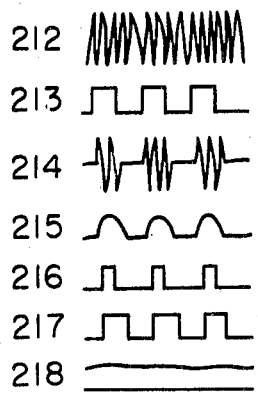
FIG. 7B is a view of wave shapes at points in the operation of the carrying apparatus.

A square wave oscillator 210 generates the speed instruction signal which may have a waveform as indicated by numeral 213 in FIG. 7B and the frequency of which may be increased as the speed increases. This frequency may be varied continuously by a potentiometer 211. A modulator 209 modulates the carrier 212 by square wave 213 to produce a signal indicated by numeral 214 in FIG. 7B. This modulated signal is superposed on the power signal in the power supply lines 2 through the capacitor 204.

The apparatus 1 receives the speed instruction signal and power signal through the collector 40 from the power supply lines 2. The control device 30 receives only the speed instruction signal through a capacitor 220. Then, a high-frequency amplifier 221 amplifies it, a detector 222 detects it to produce a signal as indicated by numeral 215 in FIG. 7B. A low pass filter 223 eliminates a high-frequency carrier and noise from this detected signal. A low-frequency amplifier 224 amplifies its output signal. Then a wave shaper 225 produces a square wave signal as indicated by numeral 216 in FIG. 7B. A pulse width shaper 226 produces a square wave having a constant pulse width from the previous signal which wave is indicated by numeral 217 in FIG. 7B. An integrating circuit 227 produces a direct current voltage as indicated by numeral 218 in FIG. 7B having a voltage proportional to the period of the speed instruction signal. That is, the voltage representative of the high-speed instruction has a high voltage, and that of low-speed instruction has a low voltage.

The output signal of the integrating circuit is then applied to a motor speed control circuit 229. In some cases, the signal to the input of the speed control circuit 229 may be obtained from a speed-determining device 219 including a potentiometer and a DC power source contained within the control device 30 of the apparatus 1, as seen in FIG. 7A.

Either the output of the integrating circuit 227 or the preset voltage of the speed-determining device is applied to an input line 230 of the motor speed control circuit 229, and it is combined with a speed-detected feedback voltage from a feedback line 231, and then the combined signal is applied to a direct current amplifier 232 where it is amplified. The amplified signal is applied to a voltage-phase converter 233 which produces a signal having a relative phase with respect to the power signal the magnitude of which is proportional to the amplitude of said amplified signal. This phase signal is then applied to a power control circuit 234. The output signal from the power control circuit 234 is applied to a motor 235 (M1), which rotates to drive wheels 50 so that the apparatus 1 runs on the rail 51.

A gear 236 made of material having high magnetic permeability is attached to the shaft of the motor 235, and a speed detector 237 provided oppositely adjacent to the gear 236 detects the rotating speed of the motor 235 to produce a pulse. This pulse is amplified by an amplifier 238, and is applied through a wave shaper 239, a pulse width shaper 240, an integrating circuit 241, and feedback line 231 to the input of the control circuit 229 as a feedback signal so as to automatically maintain, the speed of the motor 235 constant.

Figure 8A:
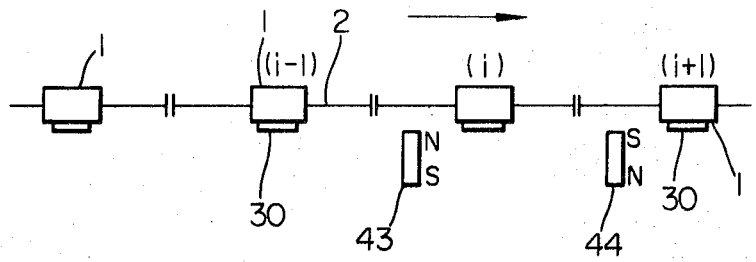
FIGS. 8A to 8C are explanatory views of another embodiment of the speed control system for the carrying apparatus.
Figure 8B:
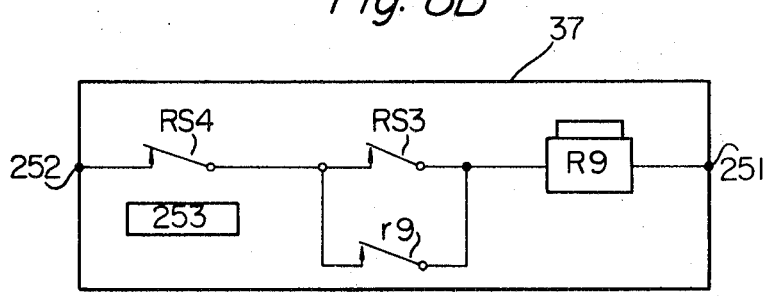
Figure 8C:
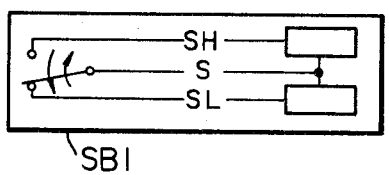

Referring now to FIGS. 8A to 8C, there is shown diagrammatically another embodiment of the speed control system for the apparatus 1, which system is of the magnetic type.

Referring particularly to FIG. 8A, the apparatus 1 runs through sections ($i-1$), ($i$) and ($i+1$) of the rails 51 in the direction indicated by an arrow along the rail. It is assumed that the apparatus 1 runs in the section ($i$) at high speed, and runs in the section ($i+1$) at low speed. A high-speed instruction device 43 is disposed near the entrance of the section ($i$) along the rail 51, and a low-speed instruction device 44 is disposed near the entrance of the section ($i+1$) along the rail 51.

When the apparatus 1 runs into the section ($i$), it receives a high-speed instruction from the high-speed instruction device 43, thereby it begins to run at high speed. When the apparatus 1 runs into the section ($i+1$) it receives a low-speed instruction from the low-speed instruction device 44, thereby it returns at its original slow speed.

The speed instruction devices are made of permanent magnet and the polarity of the high-speed instruction device 43 is opposite to that of the low-speed instruction device 44.

FIG. 8B shows the speed instructions detector 37 forming an instruction responsive portion to be mounted within the control device 30 in the apparatus 1.

The speed instruction detector 37 includes relays RS3 and RS4, such as reed relays or switches responsive to the external magnetic field produced by the instruction device, which are connected in series with each other, relay R9 connected in series with the relay RS3 and its contact r9 connected in parallel with the reed relay RS3. The contact of the relay RS4 is normally closed, while the contact of the relay RS3 is normally open. The contact r9 closes when current flows through the relay R9. The speed instruction detector circuit 37 is connected to the power source at its terminals 251, 252.

The speed instruction detector 37 is attached to a suitable position on the outside of the apparatus 1 so as to be easily responsive to the external magnetic field produced by the speed instruction device disposed along the rail 51. The reed relay RS4 has a magnet 253, and its contact will not open unless the external magnetic field is applied thereto. The speed instruction detector 37 is arranged so that the relay RS3 is disposed at the foremost end of the running direction of the apparatus 1.

It is supposed that the polarity of the magnet 43 is the same as that of the magnetic field of the magnet 253. When the apparatus 1 enters from the section ($i-i$) into the section ($i$) and passes by the high-speed instruction device 43, the contact of the relay RS4 does not open, on the other hand, the reed relay RS3 responds to the magnetic field of the magnet 43 to close its contact. Thus, current flows through the relay R9 so that its contact r9 closes to interlock the relay R9, as a result of which the apparatus 1 continues to run at high speed even after it has passed over the high-speed instruction device.

Then, when the apparatus 1 runs into the section ($i+1$) and passes by the low-speed instruction device 44 disposed in opposite polarity to that of the magnetic field of the magnet 43, the contact of the relay RS3 opens since strength of both magnetic fields weaken each other. Though the relay RS3 is opened, since the contact r9 has already been closed and therefore the circuit through the relay R9 is kept closed. Thereafter, when the relay RS4 responds to the magnetic field of the magnet 44 to open its contact, the relay R9 is kept closed. Thereafter, when the relay RS4 responds to the magnetic field of the magnet 44 to open its contact, the relay R9 is deenergized to open its contact r9, and consequently the interlocking of the device 37 by the contact r9 is released.

In FIG. 8C, there is shown a device which is used to generate a high-speed instruction and a low-speed instruction and which may be used with said relay R9.

A switch box SB1 is used with the relay R9. The switching means SB1 is arranged such that a connection is made between S and SH when current flows through the relay R9, and that a connection is made between S and SL when the relay R9 is cut off. Thus, when it receives a high-speed instruction from the magnet 43 in the section ($i$), S is connected to SH, and when it receives a low-speed instruction from the magnet 44 in the section ($i+1$), S is connected to SL. This switch may be used for providing two kinds of signal, i.e., a high-speed instruction and a low-speed instruction for the speed control circuit of the apparatus 1.

Thus the speed of the apparatus 1 may be very easily controlled automatically by means of very simple component such as permanent magnet, and the corresponding reed relays or switches. Further, the speed of the apparatus 1 may be controlled any place along the rail very easily. The magnet may be a permanent magnet or an electromagnet.

SECTION CONTROL APPARATUS

Figure 9B:
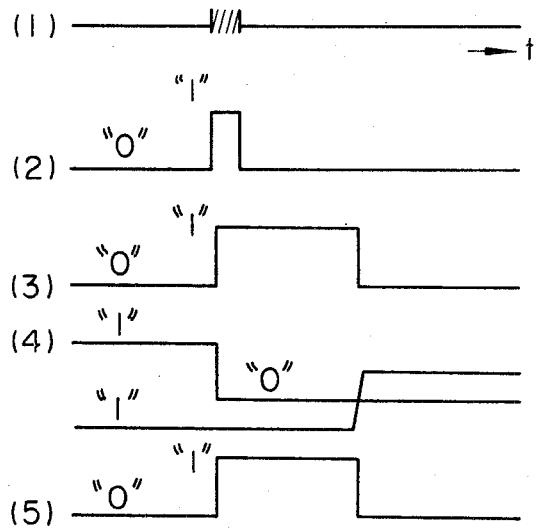
FIG. 9B is a view showing wave shapes at various points in FIG. 9A.
Figure 9A:
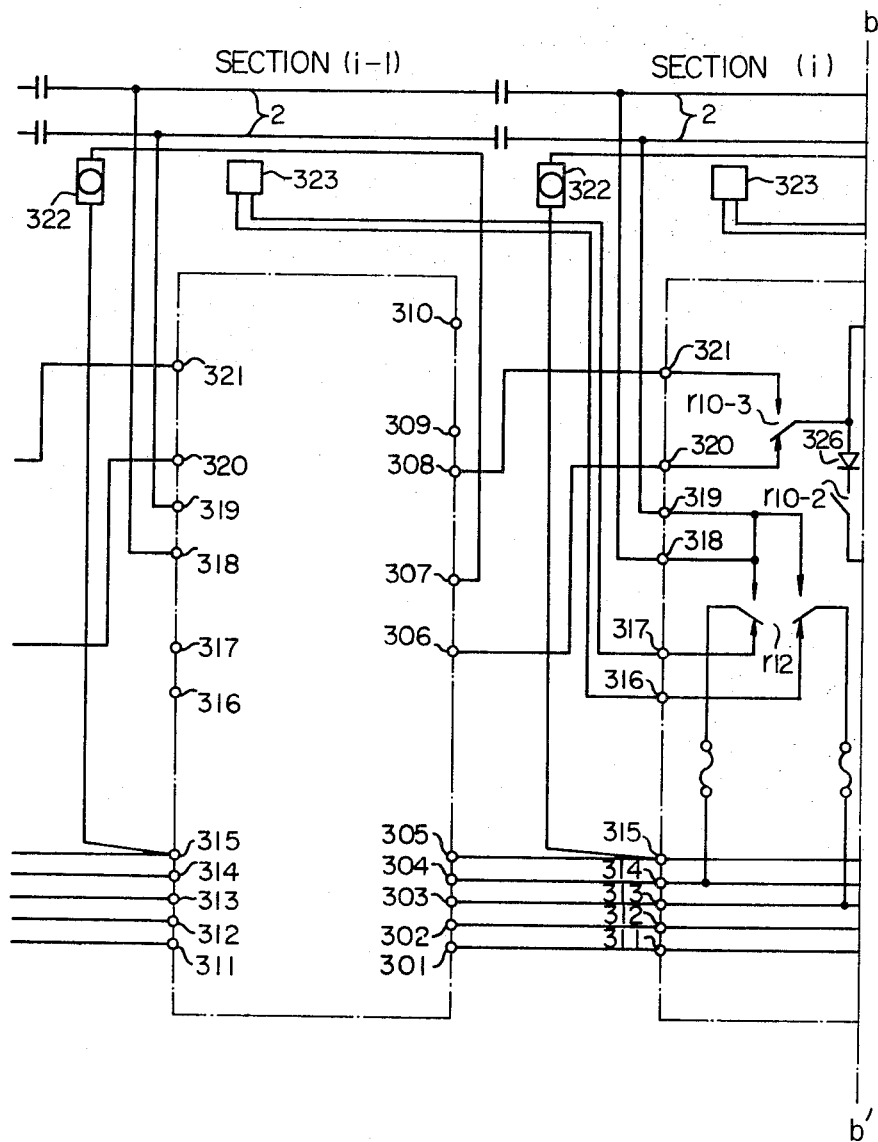
FIG. 9A is a schematic wiring diagram of the section control apparatus according to this invention.

Referring now to FIG. 9A, it shows one example of an electric wiring diagram of the section control circuit.

Figure 9A:
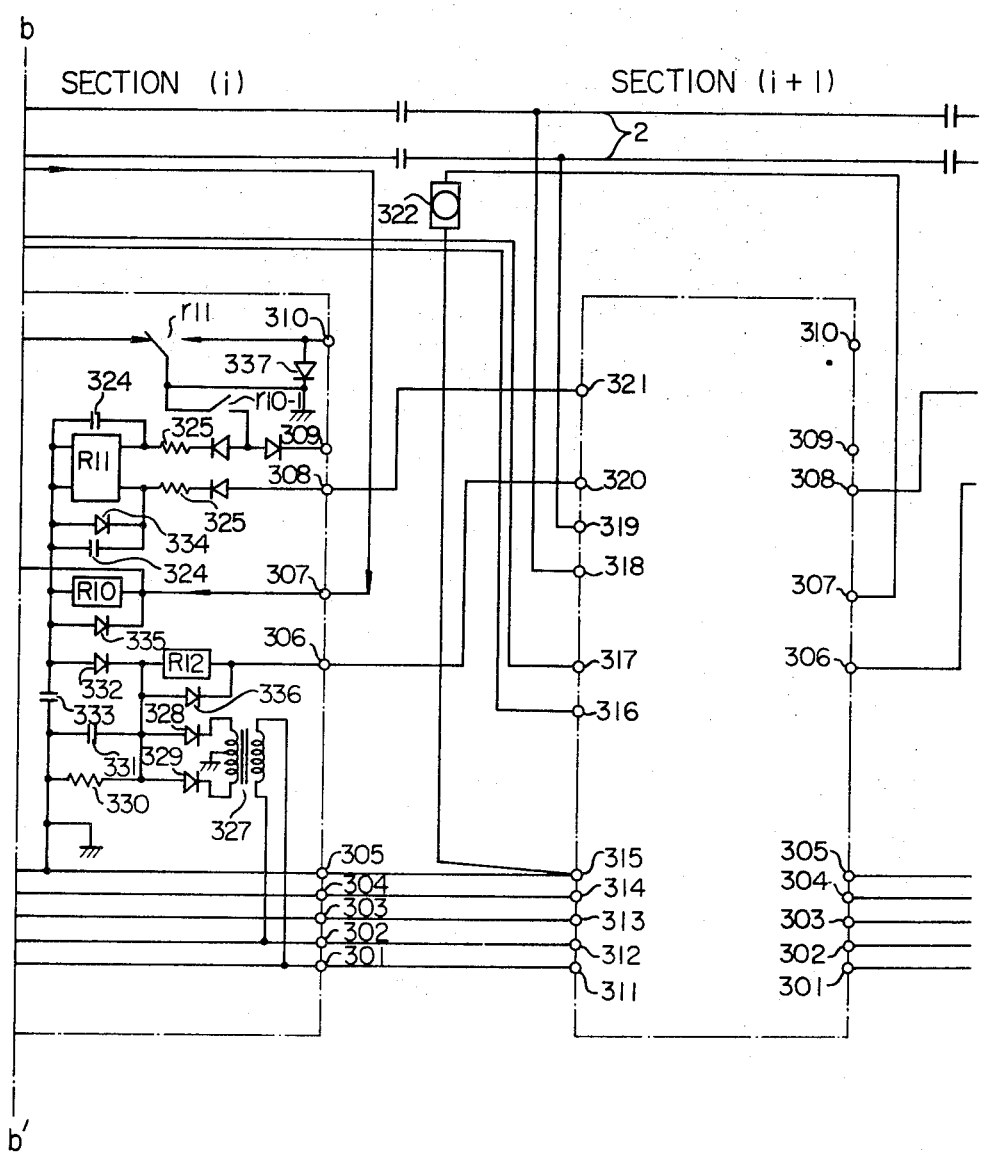

Normally, a contact r11 of a relay R11 is closed at its left side. When the apparatus 1 runs into the section ($i$) from the section ($i-1$), a detector 322 provided at the entrance of the section ($i$) detects the apparatus 1 so that it produces a signal to be fed to the relay R10. When the relay R10 receives the signal from the detector 322, it is energized to close its contact r10–1, thereby the upper side of the relay R11 is grounded. Thus, its contact r11 is closed at its left side in FIG. 9. A terminal 320 of the section control circuit of the section ($i$) is connected through a terminal 306 of the section control circuit of the section ($i-1$) to a relay 12 of the section control circuit of the section ($i-1$). This relationship of connection between the adjacent sections can be applied to all of the remaining section control circuits. A contact r10–3 is normally closed at its lower side in FIG. 9A so that the terminal 320 of the section ($i$) is grounded through the contact r10–3 and contact r11 of the relay R11. Thus, the relay R12 of the section ($i-1$) is grounded so as to close its double throw contacts r12 at their lower sides. Thus, the power from the terminals 303, 304 is applied through the contacts r12 and terminals 318, 319 to the power supply lines 2. When the relay R10 is energized, the contact r10–3 is switched to close at its upper side in FIG. 9A, thereby the relay R12 in the section ($i-1$) is disconnected from the ground so that the supply lines 2 are disconnected from the power supply.

A capacitor 324 and a resistor 325 are connected respectively in parallel and in series with the relay R11, thereby the energization of the relay 11 is delayed a period determined by the time constant of the capacitor 324 and resistor 325 after the energization of the relay R10. This delay time may be varied by varying either the capacitance of the capacitor 324 of the resistance of the resistor 325, but since if the resistance is varied the current flowing through the relay R11 varies, the capacitance may preferably be varied.

During this delay time, even if the contacts r10–3 (FIG. 9A) are closed at their upper side, that is, even if the power is applied to the power supply lines 2, the contact r11 is not switched (i.e., the right side is kept closed) since the relay R11 is not energized for the reason that a terminal 321 of the section ($i$) is grounded so that current flows through the lower side of the relay R11 of the section ($i-1$) so as to keep its contact r11 closed at its left side.

Referring now to FIG. 9B, the timing relationship of the waves at various points in the section control circuit is shown. The wave shape (1) represents a detecting time of the detector 322, wave shape (2) represents a detected signal at the terminal 307, the wave shape (3) represents that at the terminal 309, the wave shape (4) represents examples of the potential change at the terminal 320 (negative going) and the state of transition of the contact r11 (positive going) and the wave shape (5) represents a wave shape at the terminal 321.

When the apparatus 1 runs from the section (i) into the section (i+1), the power to the supply lines 2 in the section (i) is cut off, in a similar manner to that aforementioned as to the section (i), by virtue of the operation of the section (i+1). Particularly from the terminal 321 of the section (i+1) a signal, such as the wave shape (5) in FIG. 9B, is supplied back to the lower side of the relay R11 in the section (i) through the terminal 308 thereof to ground it, thereby its contact r11 is closed at its left side. Thus, the relay R12 in the section (i−1) is grounded through the terminal 320 of the section (i), thereby its contact r12 is switched so as to permit the power to be applied through the contacts r12 to the power supply lines in the section (i−1).

While the apparatus 1 is running within the range detectable by the detector 322 and the relay R10 is energized, a ground signal appears at the terminal 309. This ground signal may be used as a signal indicating that the apparatus 1 has entered into the section in question. Also, the signal from the same detector appearing at the terminal 309, such as 322, may be utilized for stopping or starting the apparatus 1 at a predetermined position in a certain section to control lifting and lowering of the apparatus 1 as well as to control loading and unloading. Also, this signal may be used for controlling a predetermined treatment of the load of the apparatus 1. While the contact r11 of the relay R11 is closed at its right side, a ground signal is present at the terminal 310, which signal may be used to indicate that the apparatus 1 is present in the section.

When the period during which the detector 322 detects the apparatus 1 running at high speed by energizing the relay R10, is shorter than the delay time of the relay R11, it may happen that the power from the power supply lines 2 in the immediately succeeding section will not be cut off after the apparatus 1 has entered into the present section. In order to prevent this, a contact r10−2 and diode 326 are provided so as to self-hold the relay R10 during the period. The diode 326 prevents the terminal 320 from being grounded by the contact r10−2 even after r11 has been switched to close at its right side in FIG. 9A. Further, the diode 326 shuts off the current through the relay R10 so that it prevents its surge from affecting the contact r11.

A DC power supply for relays is provided by a power transformer 327, diodes 328,329 resistor 330 and capacitor 331. This DC power is supplied through a diode 332 and capacitor 333 to the relays R10, R11. The capacitance of the capacitor 333 is preferably selected so that the electric charge on it is sufficient to energize the relays R10 and R11. Now, let us suppose that the power supply either for the control device alone (at terminals 301, 302) or for both the control device and the main power (at terminals 303, 304) fail. It may happen that the apparatus 1 running in the section (i−1) cannot stop simultaneously with the occurrence of the failure of power supply because of its running inertia so that it runs into the section (i) thereby to allow the detector 322 to operate. In this case, the charge of the capacitor 333 cannot be discharged to the coil of the relay R12 due to the presence of the diode 332, even though the control power is cut off in the section (i). However, since the detector 322 has been activated to energize the relay R10 and the charge of the capacitor 333 energizes the relay R11 so that the power to the supply lines 2 is cut off in the section (i−1) and so that the terminal 320 in the section (i) is disconnected from the ground, the power cannot be supplied to the section (i−1) unless the relay R11 in the section (i) is energized, even if the power is supplied again to the section (i). Therefore, the relay R12 in the section (i−1) remains deenergized and the power is not supplied to the power supply lines 2 in that section. Thus, upon the failure of the power supply, even if the detector 322 is activated only once, the power to the immediately succeeding section is cut off without mistake.

When the power is not supplied to the supply lines 2 in the section (i), the contacts r12 of the relay R12 in the section (i) are closed at their lower sides so that the power is applied to the terminals 316,317. At the entrance of the section (i−1), a low speed instruction device 323 may be provided which is connected to the terminals 316, 317. The low-speed instruction device 323 can be used to reduce the speed of the carrying apparatus 1 soon after it has entered into the section (i−1) so that the apparatus 1 may be stopped with less shock when it runs into the section (i).

In FIG. 9A, diodes 334, 335, 336, 337 are used for absorbing the surge of the power.

Branching and Joining Apparatus

Figure 10A:
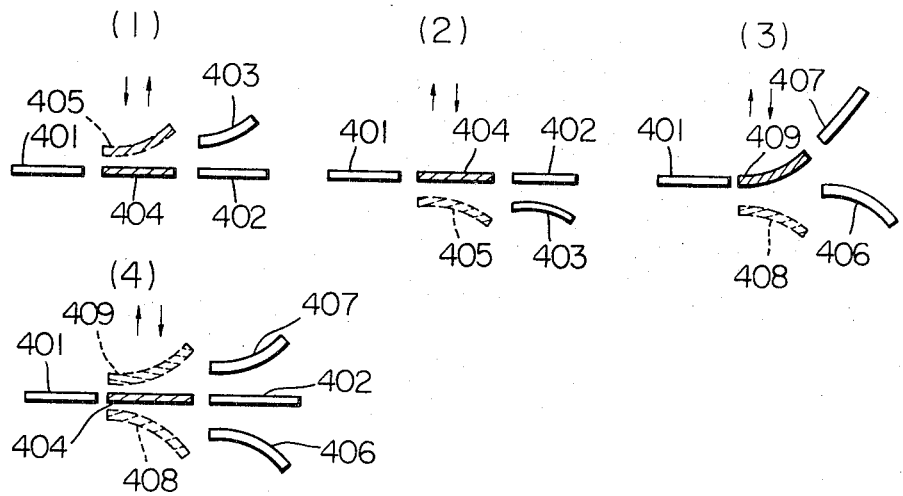
FIG. 10A is an explanatory view showing how a branching operation is effected on the rail.

Referring now to FIG. 10A, several branching rails are shown;
(1) illustrates right-hand branching,
(2) illustrates left-hand branching,
(3) illustrates Y-shape branching, and
(4) illustrates three-way branching.

In the above branching apparatus, rails 401, 402 403, 406 and 407 are fixed, and rails 404, 405, 408 and 409 are movable. The rail 404 is integral with the rail 405. The rail 408 is integral with the rail 409, and the rail 404 in FIG. 10A(4) is integral with the rails 408 and 409, as will be seen later. The rail sets 404 and 405, 408 and 409 and 404, 408 and 409 move perpendicular to the direction of the rails 401 and 402.

Only the left-hand branching operation will be described in detail, since the other branching operations are similar.

Figure 10B:
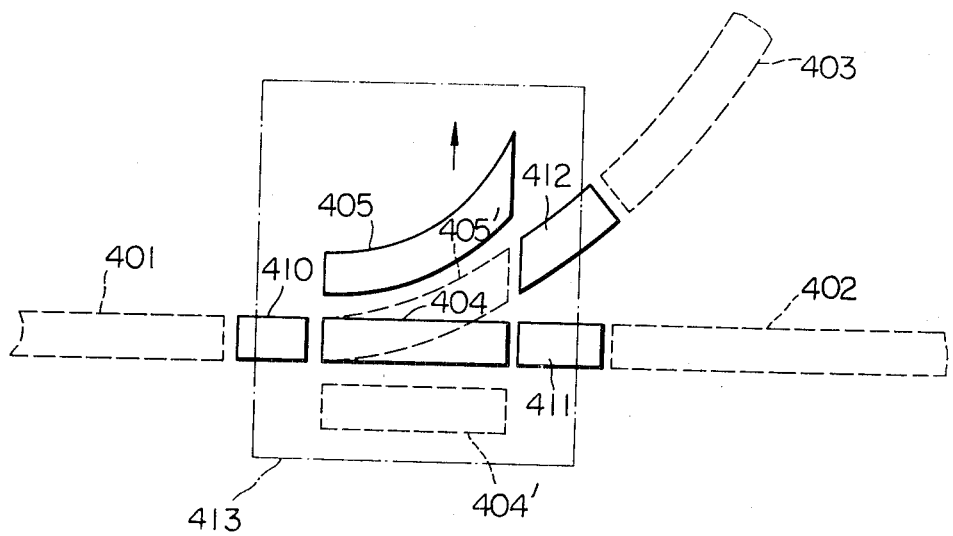
FIG. 10B is an operation explanatory view of a left-hand branching apparatus as one embodiment of this invention.

Referring particularly to FIG. 10B, the principle of the left-hand branching operation is shown.

The left-hand branching apparatus includes fixed rails 401, 402, 403, movable rails 404, 405, and auxiliary fixed rails 410, 411, 412 which provide a smooth running of the apparatus 1 in the branching operation. The auxiliary fixed rails 410, 411 and 412 and the movable rails 404 and 405 form an integral unit of the branching apparatus, in which the movable rails 404 and 405 are interconnected so that they can move together. In order to execute the left-hand branching of the apparatus 1, the movable rails 404 and 405 are displaced to the position indicated by numerals 404', 405', as will be described hereinafter.

Figure 10C:
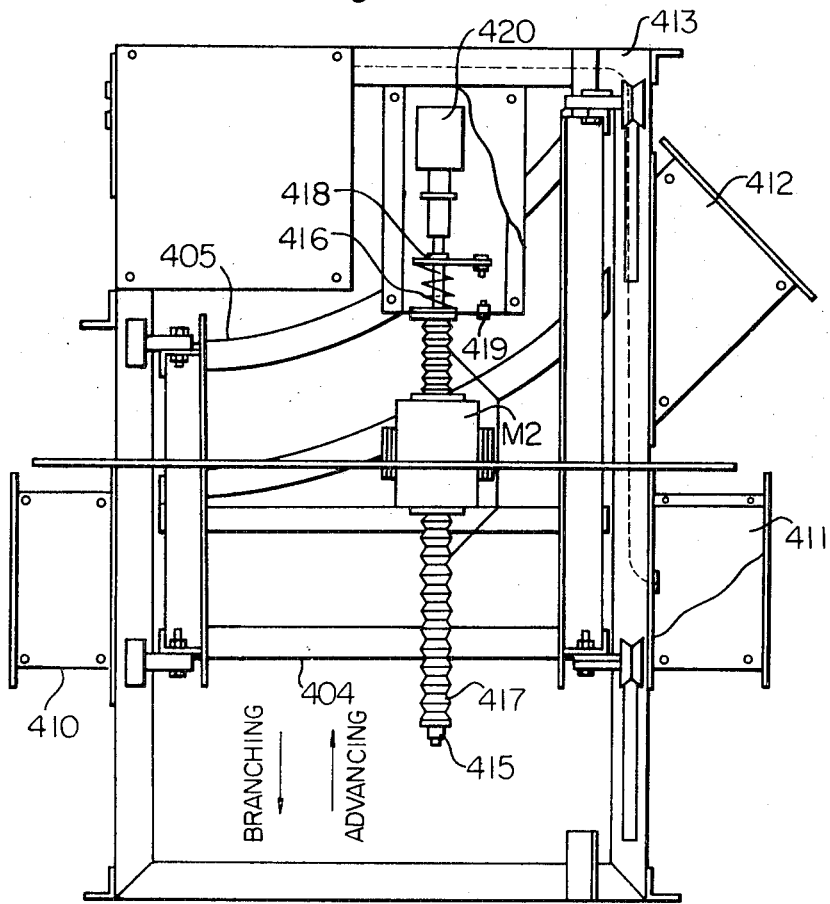
FIG. 10C is a plan view of the branching apparatus of the rail.

Referring now to FIG. 10C, a structure of one example of the branching apparatus is shown.

A drive motor M2 includes a stator and a rotor (not shown) with which a threadened shaft 415 is intermeshed. When the motor M2 rotates, the movable rails 404, 405 are moved together perpendicularly to the rails.

One end of the shaft 415 is fixed to the machine frame 413 through a coil spring 416, and the movable rails 404, 405 are adapted to be moved perpendicularly together with the motor M2. More particularly, when the motor M2 is energized its rotor rotates so that it moves on the shaft 415 and thus the movable rails 404 and 405 move therewith. The shaft 415 may preferably be protected from dust by a member, such as bellows 417. Thus, the rotative motion of the rotor is converted to a linear motion very easily and simply.

The coil spring 416 is engaged between a washer 418 secured to the end of the shaft 415 and a casing 419 fixed to the frame 413 so that it permits the rails 404 and 405 to be engaged surely by the auxiliary fixed rails through stoppers secured to the movable rails. More particularly, the spring 416 maintains its free size when the rails 404,405 are disposed at an intermediate position between the "straightforward" position whereat the carrying apparatus 1 is advanced straightly without being branched and the "branch" position whereat the apparatus 1 undergoes a branching operation. When the movable rails are to be positioned in the "straightforward" position as shown in FIG. 10C, the motor M2 moves upward in FIG. 10C along the shaft 415 together with the movable rails until the stoppers (not shown) provided at both lower ends (in FIG. 10C) of the movable rail 404 contact the lower ends (FIG. 10C) of the auxiliary fixed rails 410 and 411, where a compressive force is produced in the spring 416 which urges the stopper against the auxiliary fixed rails. Thus, the movable rail 404 is engaged surely by the auxiliary fixed rails. On the other hand, when the movable rail 405 is to be positioned at the "branch" position, the drive motor M2 moves downward in FIG. 10C along the shaft 415 together with the movable rails until the stoppers (not shown) provided at both upper ends of the movable rail 405 contact the lower ends of the auxiliary fixed rails 410, 412, where a tension is produces in the spring 416 which urges the stopper. Thus, the movable rail 405 is engaged surely by the auxiliary fixed rails.

A branching position detector 420 detects the present position ("straightforward", "branch", or "intermediate" positions) of the movable rails from the position of the shaft 415.

Figure 10D:
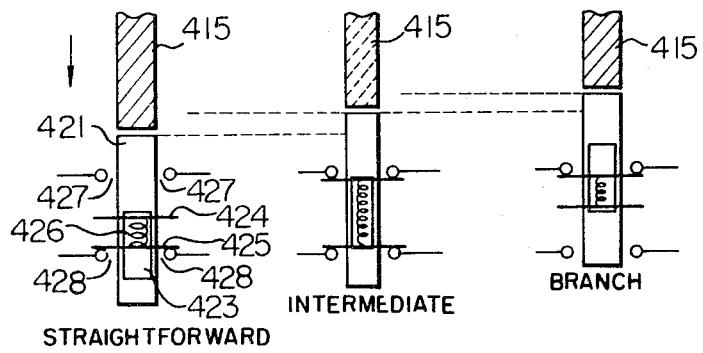
FIG. 10D is a view explaining the operation of the branching position detector of the branching apparatus.

Referring now to FIG. 10D, the principle of the operation of the detector 420 is illustrated. It has a structure which detects the three positions by means of one limit switch. One end of the shaft 415 is engaged with a lever 421 of the limit switch, which lever has a groove 423 therein. Further, contacting plates 424 and 425 are provided so that they can move freely within the groove 423 along the axis of the lever 421. A spring 426 is provided between the plates 424 and 425. Contacting members 427, 428 are provided at both sides of the contacting plates so that the members can respectively be closed electrically by means of the plates 423, 424 in accordance with the axial position of the lever 421. The axial length of the groove 423 is selected to be not smaller than the distance between the contacting members 427 and 428.

Referring particularly to FIG. 10D(1), when the movable rails are disposed in the "straightforward" position, the lever 421 is extremely urged to its lowermost position, as shown in the drawing, so that only the member 428 is closed by the plate 425.

Referring to FIG. 10D(2), when the movable rails are disposed in a position intermediate the "branch" and "straightforward" positions, the shaft 415 and hence the lever 421 is moved upwardly in the drawing half a way of its full stroke to a position where the spring 426 expands almost in its free size. Thus, both of the circuits through the members 427 and 428 are closed by the plates 425 and 426.

Referring to FIG. 10D(3), when the movable rails are disposed in the "branch" position, the shaft 415 is positioned at its uppermost position in the drawing so that only the circuit through the member 427 is closed by the plate 424. Thus, the three positions may be very easily detected.

BRANCHING CONTROL CIRCUIT

Figure 11A:
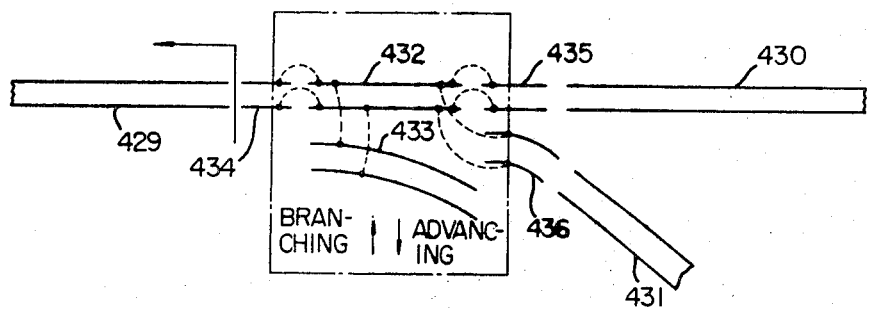
FIG. 11A is a wiring diagram of the rail of the branching apparatus.

Referring now to FIG. 11A, a schematic diagram of a power connection of the branching apparatus is shown.

The fixed rails 401, 402, 403 have power supply lines 429, 430, 431 therewithin, respectively. Similarly, the movable rails have power supply lines 432, 433, respectively, and the auxiliary fixed rails 410, 411 and 412 include power supply lines 434, 435, 436, respectively.

Figure 11B:
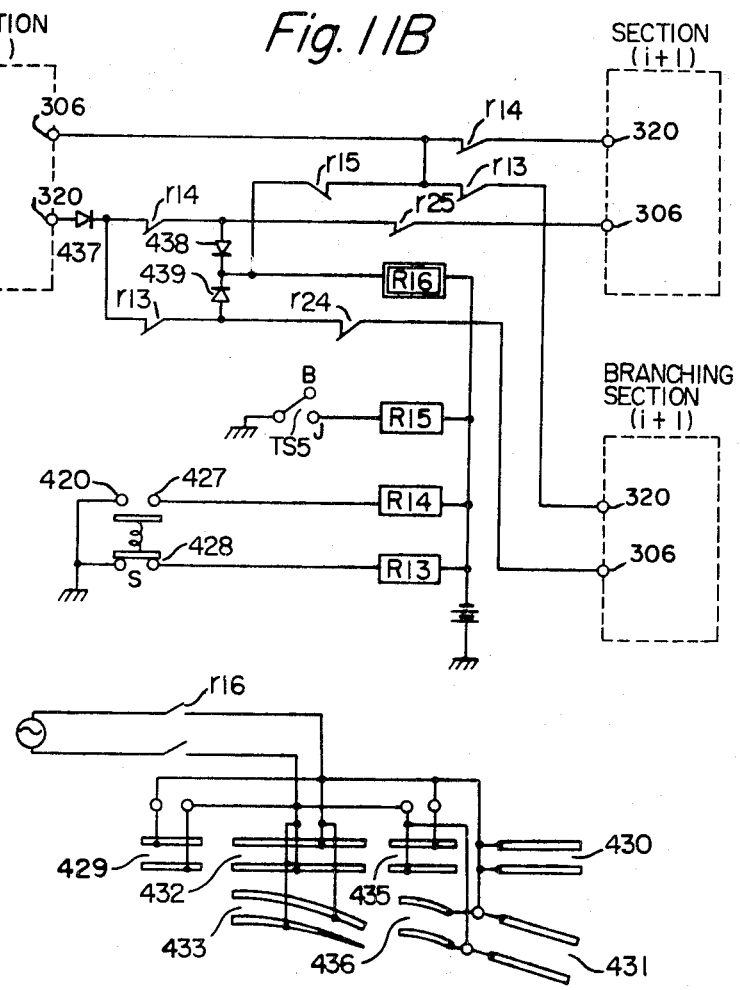
FIG. 11B is a schematic wiring diagram of the branching control circuit.

Referring now to FIG. 11B, it shows a branching control circuit for controlling the power supply to the supply lines in the branching apparatus.

In FIG. 11B, the blocks indicated by broken lines show the section control circuits of the sections (i), (i+1) and branching section (i+1), which are the same as those in FIG. 9A, and only the terminals 306, 320 are shown for explanatory purposes.

When a branching or joining transfer switch TS5 is switched to "branch" position (i.e., it is opened) as shown in FIG. 11B, a relay R15, is deenergized to close its contact r15. The terminals 320 of the section control circuits of the section (i+1) and of the branching section (i+1) are connected respectively through the contacts r14 and 413 of relays R14 and R13 to the terminal 306 of the section control circuit of the section (i). Also, said terminals 320 are connected to the relay R16 through the contact r15 of the relay R15. Said terminal 306 of the section (i) is adapted to be grounded so that the power is supplied to the supply lines of the section (i). Then the relay R16 is grounded through the contact r15 of a relay R15 and the contact r16 is closed at its lower side in FIG. 11B so that the power is supplied to all of the supply lines in the branching section. However, in this case, in order that the power may be supplied to all of the supply lines, it is necessary that the contacts r14 or 413 be closed. This means that the relay R14 must have been energized by closing the contact 427 of the position detector 420 while the movable rails are disposed in "straightforward" position, or that the relay R13 must have been energized by closing the contact 428 while the movable rails are disposed in "branch" position. Thus, it is apparent that the power cannot be supplied to the power supply lines 2 and therefore the carrying apparatus cannot move unless the movable rails have been transferred completely. Thus, the apparatus 1 will never collide against the movable rails.

When the switch TS5 is switched to "joining" position (i.e., it is closed), the relay R15 is energized to open its contact r15, thereby the branching circuit opens. The joining operation may be carried out easily by causing the carrying apparatus 1 to run through the branching apparatus in the opposite direction to that in which the carrying apparatus 1 runs during branching operation. The relay R16 is energized from the terminal 306 of the section (i) through a diode 437, one of the contacts r14 and r13, and one of the diodes 438 and 439, respectively, so that its contact r16 closes, thereby the power is supplied to the supply lines 2 of all the rails in the joining apparatus. However, in this case, similar to the case of branching operation as aforementioned, the contacts r14 or r13 must have been closed before the joining apparatus is operated. And similarly, the apparatus 1 will never collide against the movable rails.

Figure 11C:
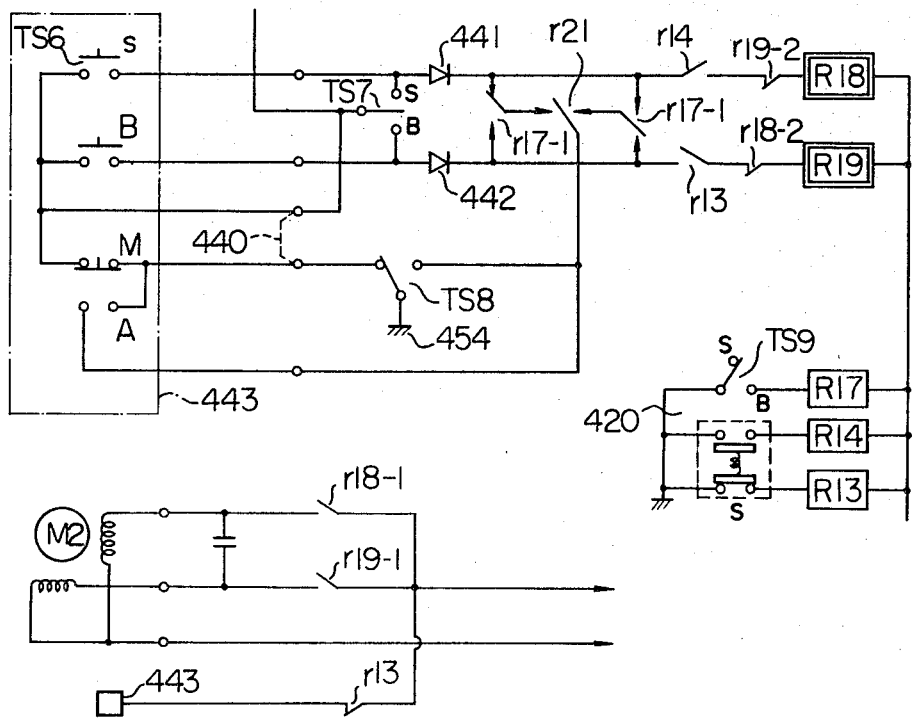
FIG. 11C is a schematic view of the wiring diagram of the movable rail switching of the branching apparatus.

Referring now to FIG. 11C, it shows a schematic electric wiring diagram of a movable rail transfer circuit.

A motor M2 may preferably be of the reversible type, and the power to it is applied through the power supply lines 2 similar to the case of the drive motor employed in the carrying apparatus 1, and it drives the movable rails through the threaded shaft, as described previously.

When the motor M2 rotates so as to drive the movable rails to "straightforward" position (or "branch" or "joining" position), the position detector 420 is activated to deenergize the relay R14 (R13), thereby its contact r14 (r13) is opened so that a relay R18 (R19) is deenergized to open its contact r18 (r19). Thus, the motor M2 stops its rotation so as to stop its movement toward the "straightforward" position ("branch" or "joining" position). In this position the relay R18 (or R19) is interlocked so that it is not energized further. That is, the relay and its contacts r13, r14 are connected in series, respectively in order that only when it moves toward "branch" or "joining" position (or "straightforward" position) it is energized.

In order to automatically operate this movable rail transfer circuit, a switch TS8 must be closed at its right side ("automatic") and a remote control switch TS6 must be closed at its "automatic" contact, or when the remote switch is disconnected, a jumper 440 must be inserted. A switch TS9 is used for switching the movable rail between the "straightforward" and the "branch" positions. When this switch TS9 is closed at its lower side (i.e., when it is positioned in "branch" position), the relay R17 is energized so that its left-hand contact r17–1 is closed at is lower side (left side), and vice versa. The right-hand contact r17–1 thereof is operated in the opposite manner to the operation of the left-hand contact r17–1.

When a relay R21, which will be described later, is energized to close its contact r21 at its right side, a relay R19 is energized through the contacts r17–1, r13, 418–2 to close its contact r19–1, thereby the motor M2 is rotated so that the movable rails are moved toward the "branch" position. Thereafter, when the contact r21 returns to its original left side position, the relay R18 is energized through the contacts r17–1 (upper side), r14, 419–2 to close its contact r18–1, thereby the motor M2 is rotated so that the movable rails are moved toward the "straightforward" position. Thus, the movable rails return to the original "straightforward" position.

In manual operation of this transfer circuit, when the remote switch TS6 is not used, the jumper 440 is inserted, and the switch TS8 is switched to "manual" position, and a switch TS7 is switched to either "straightforward" position or "branch" position. In case when the switch TS7 is switched to "straightforward" position, the relay R18 is energized through a diode 441, the contacts r14, r19-2, and in the case when the switch TS7 is switched to "branch" position the relay R19 is energized through a diode 442, the contacts r13, r18-2, so that the motor M2 is rotated in the required direction. When the remote switch TS6 is used, then the jumper 440 is disconnected, the switch TS6 is set in the condition shown in FIG. 11C (i.e., the contact "manual" is closed), and either the pushbutton "straightforward" or the pushbutton "branch" is depressed, and as a result the motor M2 is rotated in the required direction, similar to the case of said switch TS7.

The contacts r18-2 and r19-2 are cooperated so as not to close simultaneously for safety.

Referring now to FIG. 11D, a schematic diagram of a movable rail control circuit is shown.

Switch TS10 is used for effecting switching between the "branch" mode and the "joining" mode. A branching or joining apparatus comprising a detector 450 receives either a "straight-advancing" instruction or a "branch" instruction. The detector 450 will be described in further detail later in conjunction with FIG. 17.

When the switch TS10 is in the "branch" position and the "branch" instruction is detected by the detector 450, a ground signal is generated at the output of the detector 450 and a relay R26-1 is energized through a contact r23-2 and a resistor 444, so that its contact r26 is closed to energize a relay R21 so that its contact r21 is closed at its "branch" side in FIG. 11C. When the switch TS10 is in "branch" position, the relay R23 is not energized so that its contacts r23-1, r23-2 keep their positions shown in FIG. 11D. The relay R26-1 is interlocked and keeps its interlocked state unless it receives a different instruction, so that even if the power is shut off, the normal operation of the apparatus 1 is not disturbed (the relay R26-1 is integral with the relay R26-2 which is described hereinafter).

A resistor 444 and capacitor 445 are used for delay of the relay R26.

In operation of this circuit, when the apparatus 1 has passed over the branching and joining apparatus and enters into the branching section (i+1), a ground signal produced at the terminal 321 of the section control circuit of the branching section (i+1) is passed into the movable rails control circuit. This ground signal is also applied to the terminal 308 of the section control circuit of the section (i). Simultaneously, the relay R26-2 is energized by the ground signal through the contact r23-1, a diode 446 and a resistor 447 to open its contact r26, thereby the relay R21 is deenergized whereby its contact r21 shown in FIG. 11C is returned to its original "straightforward" position. Thus, the movable rails are returned to the original "straightforward" position. A diode 446 is used for preventing the counter current, and a resistor 447 is used as a voltage divider.

When the switch TS10 is switched to "joining" position, the relay R23 is energized by ground signal, so that its contacts r23-1 and r23-2 are switched to their positions opposite to those shown in FIG. 11D.

When the switch TS9 in FIG. 11C is in "straightforward" position, the relay R17 is not energized so that its contact R17-2 is closed at its lower side as shown in FIG. 11D. When the apparatus 1 runs into the branching section (i+1), the terminal 310 is grounded so as to energize the relay R26-1 through the contacts r17-2, r20, r21, r22, r23-2, and a resistor 444, thereby its contact r26 closes. Thus, the relay R21 is energized so that its contact r21 shown in FIG. 11C is switched to "branch" position. Then the movable rails are moved to the "branch" position, so that the apparatus 1 passes over the branching and joining apparatus into the section (i). Even if another carrying apparatus 1 runs into the section (i+1) while the preceding carrying apparatus from the branching section (i+1) is on the way to the section (i) so that the terminal 310 is grounded, the relay R20 is not energized since the relay R21 is energized so as to open its contact r21. Thus, its contact r21 is kept closed so that the relay R21 is not affected, thereby the movable rails are kept in "branch" position (the "branch" position corresponds with the "joining" position, as will be apparent). When the apparatus passes over the branching and joining apparatus and enters into the section (i), the terminal 321 of the section control circuit of the section (i) is grounded so that the relay R22 is energized, thereby its contact r22-2 is closed to energize the relay R26-2, and its contact r22-1 is opened to deenergize the relay R26-1. Thus, the relays R26-1 and R26-2 are prevented from being energized simultaneously.

When the switch TS9 is disposed in the "branch" position, the relay R17 is energized so that its contact r17-2 is switched to the position opposite to that shown in FIG. 11D. When the apparatus 1 runs into the section (i+1), the terminal 310 of the section control circuit of the section (i+1) is grounded so that the relay R26-1 is energized through the contact r17-2 similar to the case when the apparatus 1 runs into the branching section (i+1), thereby its contact r26 closes. Thus, the relay R21 is energized so that its contact r21 shown in FIG. 11C is switched to "straightforward" position. Then the movable rails are moved to the "straightforward" position and the carrying apparatus 1 moves past the branching and joining apparatus and enters into the section (i). Even if the following apparatus 1 runs into the branching section (i+1) while the apparatus 1 is on the way to the section (i), the relay R20 is not energized and the relay R21 is not affected and movable rails are kept in the "straightforward" position similar to the case when the apparatus 1 runs into the section (i+1).

When the apparatus 1 runs into the section (i+1) while the switch TS9 is in the "straightforward" position, the terminal 310 of the section control circuit of the section (i+1) is grounded, on the other hand, the relay R17 is kept deenergized so that its contact r17-2 is in the position corresponding with that shown in FIG. 11D, thereby the relay R20 is energized through the contacts r17-2 and r21 so that its contact r21 opens. Thus, the relay R26-1 is not energized and hence the relay R21 is not energized, thereby the movable rails are kept in "straightforward" position so as to allow the apparatus 1 to pass over it.

When the apparatus 1 runs into the branching section (i+1) while the switch TS9 is in the "joining" position, the terminal 310 of the section control circuit of the branching section (i+1) is grounded and the relay R17 is energized, and accordingly its contact r17-2 is switched to the position opposite to that shown in FIG. 11D, so that the relay R20 is energized through the contact r21, and the movable rails are kept in "branching" position similar to the case when the apparatus 1 runs into the section (i+1). Thus, the apparatus 1 passes over the branching and joining apparatus.

When the apparatus 1 runs into the section (i) after it has been transferred or joined by the branching and joining apparatus, a ground signal from the terminal 321 of the section control circuit of the section (i) energizes the relay R22 to close its contact r22. Since the switch TS10 is now in the "joining" position, the relay R23 is energized so that its contact r23-1 is switched to the position opposite to that shown in FIG. 11D, thereby the relay R26-2 is energized through the contact r23-1, a diode 446, a resistor 447 to open its contact r26. Thus, the relay R21 is deenergized so as to return its contact r21 to the original position, thereby the movable rails which have moved to the "joining" position return to the original position.

When the apparatus 1 passes over the branching and joining apparatus under the condition that the movable rails have not moved, the relay R26 (trip coil) is energized but its contact R26-2 is kept opened, so the relay R21 cannot be energized and the movable rails remain stationary.

When the switch TS9 is in the "straightforward" position in FIG. 11C, if the apparatus 1 moves from the section ($i$+1) into the section ($i$), the terminal 321 of the section control circuit of the section ($i$) presents a ground signal. In this state, the ground signal from the terminal 310 of the section ($i$+1) energizes the relay R20, and simultaneously the relay R24 is energized through the contact $r17$-2, a diode 450 and a contact $r25$, so that its contact $r24$ is closed. In this state, even if the apparatus 1 later runs into the branching section ($i$+1) and a ground signal is provided at the terminal 310 of the section control circuit of the branching section ($i$+1), the relays R26-1 and R25 are not energized since the contact $r20$ is opened.

However, when the carrying apparatus 1 enters into the section ($i$) while the contact $r24$ is closed and the relay R22 is energized by the ground signal from the terminal 321 of the section control circuit of the section ($i$) to close its contact $r22$-2, the terminal 308 of the section ($i$+1) is grounded only while the contact $r22$-2 is closed since the contact $r24$ is closed, as previously described. A diode 448 permits the relay R24 to self-hold the relay R24 while the contact $r22$-2 is closed. When the terminal 308 of the section control circuit of the section ($i$+1) is grounded, its terminal 340 is disconnected from the ground so that the relay R20 is deenergized to close its contact $r20$. When the apparatus 1 is in the branching section ($i$+1), since its terminal 310 is grounded, the relay R25 is energized to close its contact $r25$-2 to ground the terminal 308 of the branching section ($i$+1) thereby the relay R24 is self-held until the contact $r22$-2 opens. Then its contact $r24$-1 opens and the relay R25 is deenergized so that its contact $r25$-2 opens, whereby the terminal 308 of the branching section ($i$+1) is prevented from being grounded.

When the apparatus 1 runs from the branching section ($i$+1) into the section ($i$), the relay R25 is energized by the ground signal from the terminal 310 of the branching section ($i$+1), similar to the case when the apparatus runs from the section ($i$+1) into the section ($i$), and since the contact $r22$-2 is closed when the contact $r25$-2 is closed, the terminal 308 of the branching section ($i$+1) is grounded.

When the carrying apparatus 1 has come into the section ($i$+1) so that the terminal 310 of the section control circuit of the section ($i$+1) is grounded, since the contact $r21$ is opened as previously described, the relays R20 and R24 are not energized.

When the switch TS9 is in the "joining" position in FIG. 11C, since the contact $r17$-2 in FIG. 11D is switched to the position opposite to that shown in FIG. 11D, the contacts $r21$ and $r20$ are disposed in the interchanged positions in the circuit in comparison to the case when the switch TS9 is in "straightforward" position, so that the pairs of relays R20 and R24, R21 and R25 in the case of "straightforward advancing" mode are replaced by the pairs of relays R20 and R25, R21 and R24, respectively. The reason for this is that when the switch TS9 is in the "straightforward" position the relay R26-1 is not required to be energized by the ground signal (at terminal 310) from the section ($i$+1) since the movable rails need not be moved, whereas when the switch TS9 is in the "branch" position the movable rail must be moved in response to the ground signal from the terminal 310 of the section ($i$+1) and accordingly the ground signal has to be applied to the relay R26 through the contact $r17$-2 on one hand, and the ground signal from the terminal 310 of the section control circuit of the branching section ($i$+1) is sent to the relay R20 through the contact $r17$-2, on the other hand, since the movable rails need not be moved. The operation of the circuit during the "branch" mode is similar to that during the "straightforward advancing" mode, and, accordingly it will not be described further.

Referring back to FIG. 11C, a speed reduction magnet 443 is provided in the motor M2 circuit, and the contact $r13$ is connected therebetween so that when the movable rails are in the "branch" position the magnet is operated so that the carrying apparatus 1 is operated with stability and safety when the apparatus 1 runs on a curved rail.

TURNABLE DIRECTIONING APPARATUS

Figure 12A:
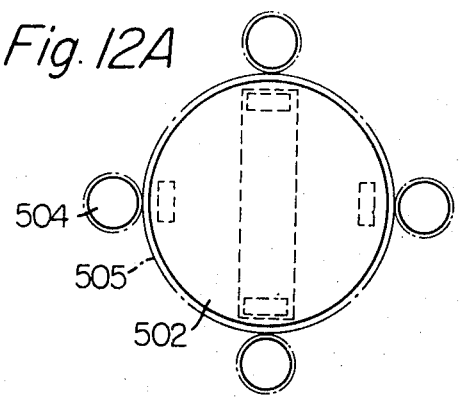
FIGS. 12A to 12C are schematic views of the turnable directioning apparatus.
Figure 12B:
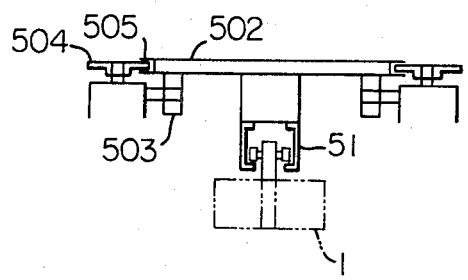
Figure 12C:
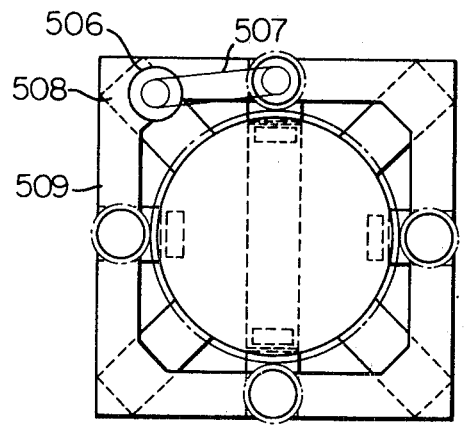

Referring now to FIGS. 12A to 12C one example of the turnable directioning apparatus is shown.

The directioning apparatus includes a circular turnable table 502, a rail 51 mounted underneath the table 502, pairs of rollers 503 provided underneath the table 502, at least two of said roller pairs being diametrically oppositely supported for free turning. It also includes a plurality of chain wheels 504 externally contacted with the table 502, and a drive motor 506 for driving one of the wheels 504 through a belt 507 to turn the table.

The directioning apparatus has also connecting rails 508 fixed to a frame 509 in each direction corresponding to each rail 51, and stoppers mounted on the rail 51 at their both ends for preventing the apparatus 1 from running out of the rail when the table is turned, which stoppers are controlled so as to be brought into and out of the operative position by a control circuit of the directioning apparatus as will be described hereinafter.

Referring now to FIG. 13A through 13G, a control circuit of the turnable directioning apparatus is shown by way of an example.

Figure 13A:
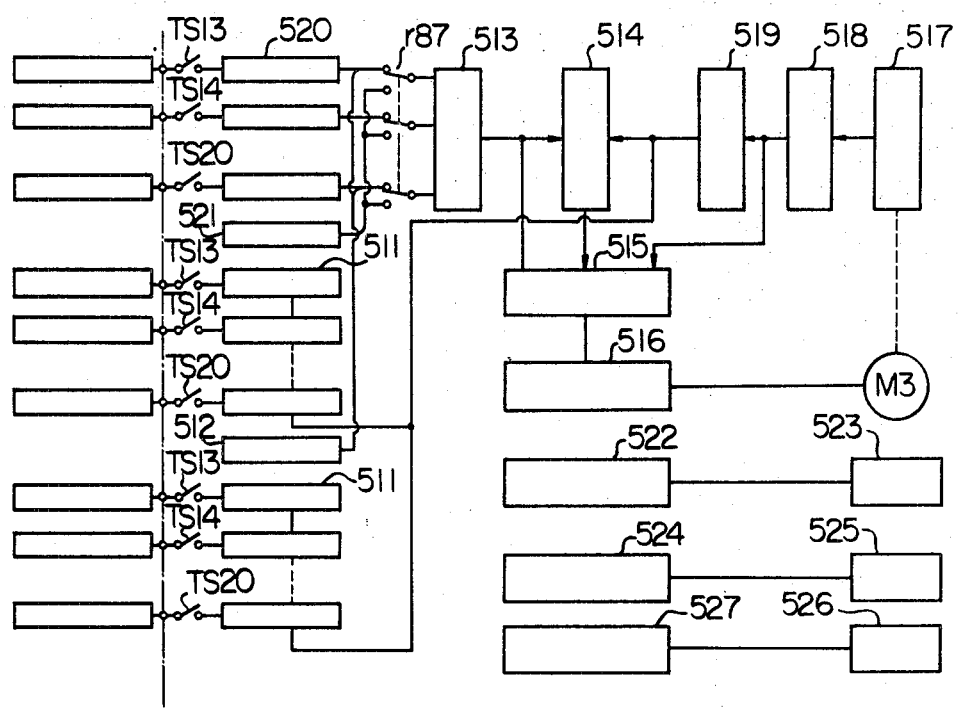
FIG. 13A is a block diagram of the directioning apparatus control circuit.

Referring particularly to FIG. 13A, a block diagram of the control circuit is shown. Assume that there are eight directions in which apparatus 1 can enter and come out of the turnable directioning apparatus, then there are eight section control circuits which must be controlled. Accordingly, the eight control circuits are connected to the section control circuit of the directioning apparatus 1. Switches TS13 through TS20 are used for switching the entrance and exit for the carrying apparatus 1 in each rail with which each section is associated.

Gate circuits 511 allow only the section control circuit of the rail with which the rail of the turnable directioning apparatus is engaged to supply a signal to the control circuit of the turnable directioning apparatus. This gate circuit 511 may be a relay circuit for connecting or disconnecting the signal produced from a position detector 517 to the control circuit of the directioning apparatus, as will be described later.

Selector circuits 520 are used for selecting any one of the apparatuses 1 to be entered into the directioning apparatus.

A rail positioner 512 is used for returning the rail 51 to a predetermined original position when there is no apparatus 1 which is going to enter into the directioning apparatus.

A directioning 1 instruction device 521 is used for instructing manually the direction of the rail.

A relay circuit 518 is used for making a connection between the control circuit of the turnable directioning apparatus and the directioning instruction device after the rail of the turnable directioning apparatus has been moved, in order to control the turning thereof.

An encoder 513 converts the directioning instruction signal or a signal instructing that the rail 51 of the directioning apparatus must be turned toward the rail on which the apparatus 1 is coming into a coded signal the format of which will be described hereinafter.

A position detector 517 detects the present rail position of the directioning apparatus to energize the corresponding relay of the relay circuit 518, and a decoder 519 decodes the signal from the relay circuit 518 and feeds it to both a coincident circuit 514 and any of the gate circuit 511 corresponding to the rail on which the apparatus runs.

A coincident circuit 514 detects the difference between the approach indicative signal or the directioning instruction signal from the encoder 513 and the present position of the rail 51 of the directioning apparatus so that if there is a difference therebetween, it will energize a direction finder 515. The direction finder 515, when activated, finds the shortest course within 180° for the rail 51 to turn to the direction of the rail on which the apparatus 1 is coming. Thus, a motor M3 is driven by the direction finder 515 through a revisible switch 516 for driving the rail 51 of the directioning apparatus.

A stopper control circuit 522 controls the operation of the stoppers 523 mounted at both ends of the rail 51 so that when the apparatus 1 is on the rail 51 of the directioning apparatus, the carrying apparatus 1 is prevented from running away therefrom during turning of the table.

A phase inverter 524 functions to invert the phase of the power signal to be applied to the supply lines 525 of the rail 51 of the turnable directioning apparatus, and in practice it is operated when the apparatus 1 is required to run out from the entrance through which the carrying apparatus 1 entered into the turnable directioning apparatus.

A detector 526 detects that the apparatus 1 enters into the rail 51 of the directioning apparatus so that the power to the supply line 525 of the rail 51 is shut off to stop it within the rail.

Figure 13B:
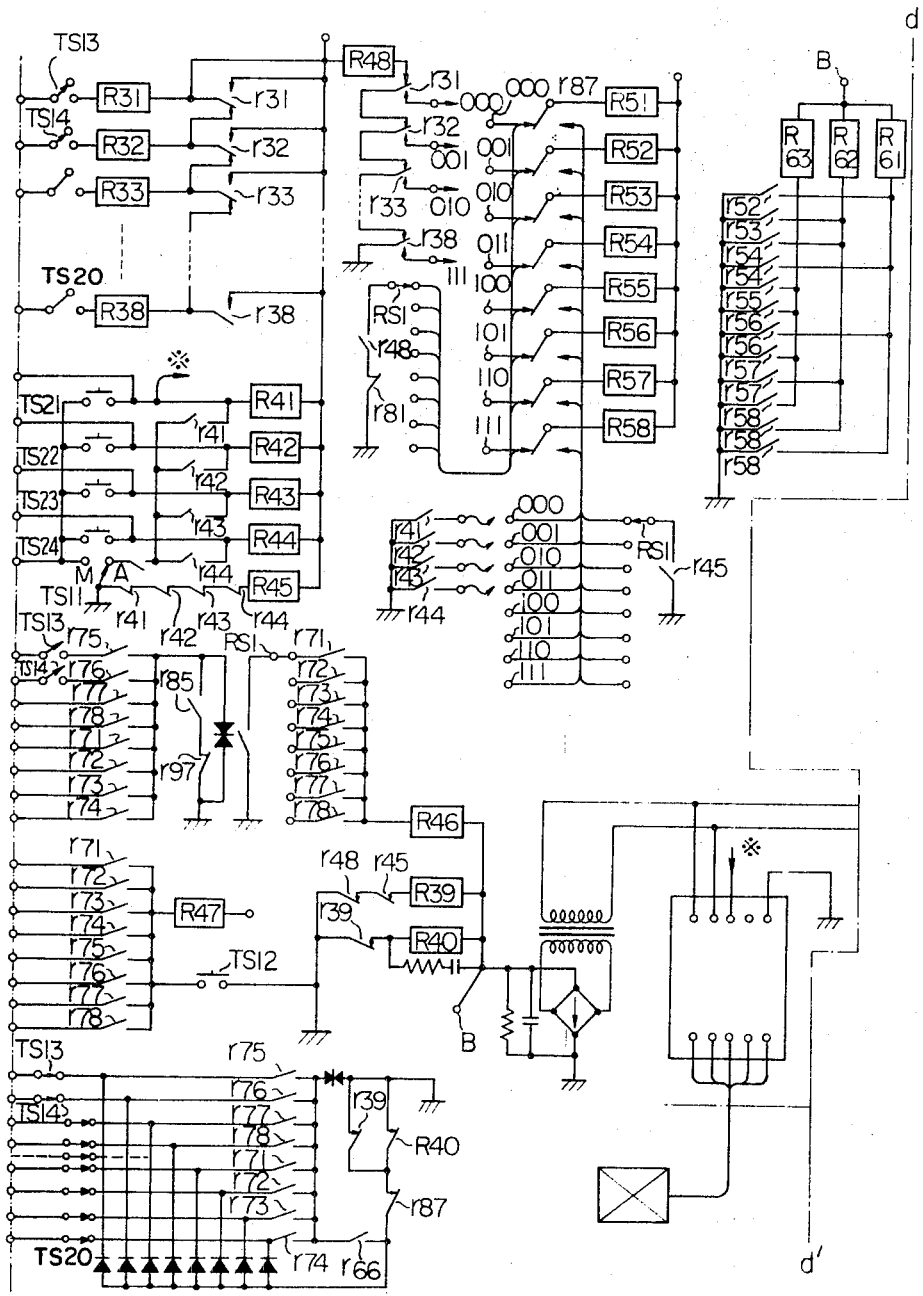
FIG. 13B is a wiring diagram of the control circuit of the directioning apparatus.
Figure 13B:
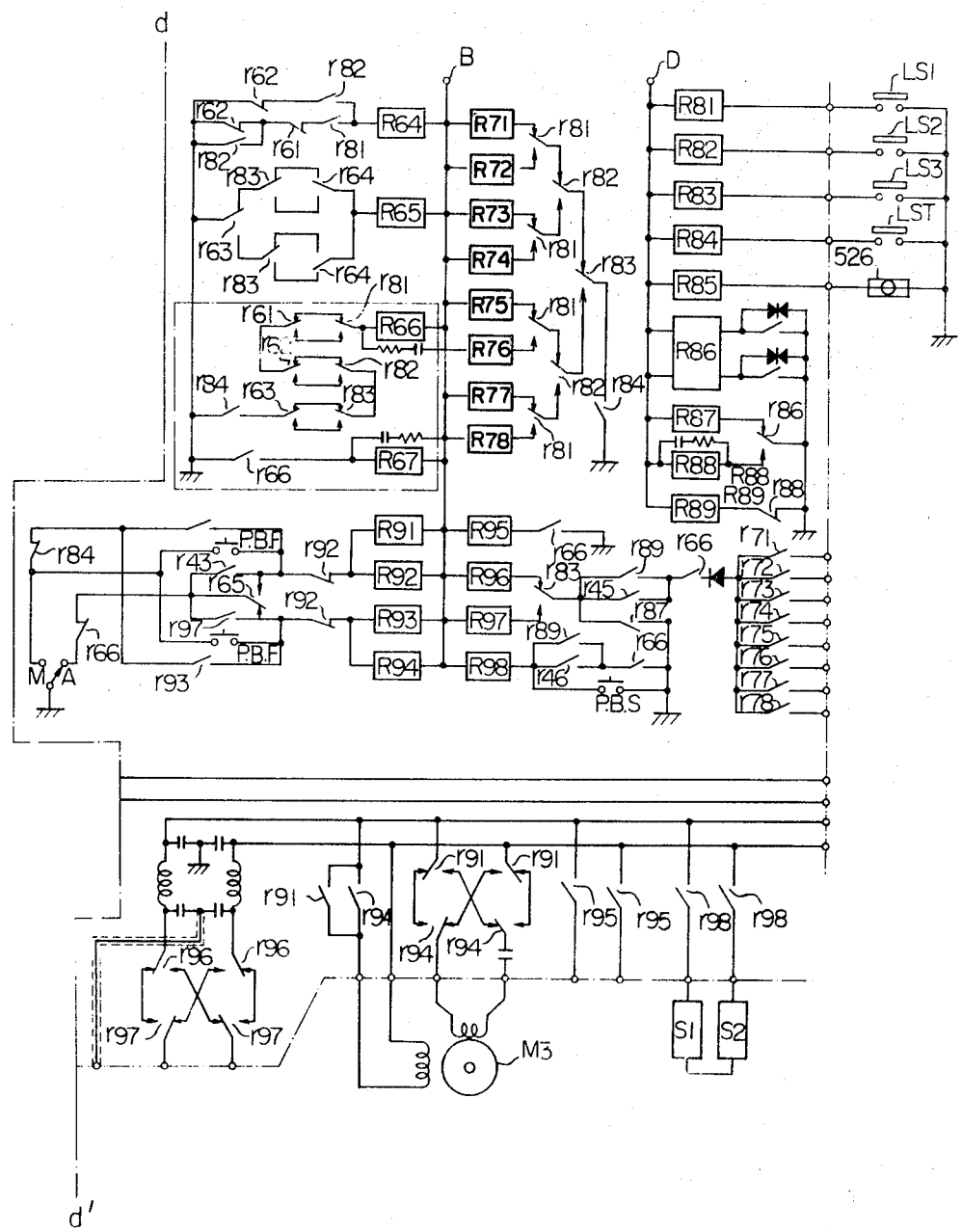

Referring now to FIG. 13B, a schematic wiring diagram is shown as one example.

When the apparatus 1 approaches the turnable directioning apparatus, any of the relays R31 through R38 of the selector circuit 520 corresponding to the section now carrying the apparatus 1 is energized to close its contacts 431 through r38 and r48, and thus the following carrying apparatus 1 will wait until the apparatus 1 completes its turning operation. In order to turn the rail of the turnable directioning apparatus into a direction corresponding to the direction of the rail along which the carrying apparatus 1 is approaching, any of the relays R51 through R58 belonging to that rail is energized to close any of the contacts r51 through r58, and then the signal from that contact is coverted to a code corresponding to that rail in the encoder comprising relays R61 through R63, and thereafter it is supplied to the coincident circuit 514. Whereas the signal from the position detector 517 energizes through the relays R81 through R83 any pair of relays R71 through R78 corresponding to the present position of the rail 51 of the directioning apparatus so that its output is sent to the coincident circuit 514 and then the rail thereof is turned to the direction from which the apparatus 1 is approaching.

When there is no carrying apparatus 1 approaching to the turnable directioning apparatus from any direction of the section, any of the relays R51 through R58 belonging to the direction which is set by a rail positioner 512 constituted by a rotary switch RS1 is energized, and thereafter the rail 51 of the directioning apparatus is turned by the operation of its control circuit in the same manner as that described in the case when the apparatus 1 is approaching.

When the apparatus 1 is approaching to the directioning apparatus, the contact r48 in the selector 520 is in the circuit of the rotary switch RS1, so that it shuts off its circuit, thereby it is controlled by the selector 520 as was described previously. In this case, it is necessary that a switch TS21 have been switched to receive the instruction signal of the rotary rail 51.

The position signal indicative of the position of the rotary rail 51 from the position detector 517 energizes any of the relays R71 through R78 corresponding to the direction of the rail 51 50 that any of the contacts r71 through r78 provided in the gate circuit 511 are closed only when the direction of the rotary rail corresponds with the direction of the rail on which the apparatus 1 comes, thereby the position signal is applied only to the section control circuits of the outer fixed rails with which the rail of the turnable directioning apparatus is associated in aligned relationship.

When the control circuit of the directioning apparatus receives the position signal, the direction finder 515 operates to find the shortest way to turn the rotary rail 51 within 180° as will be described hereinafter. When the rotary rail of the turnable directioning apparatus is aligned with the pertinent fixed rails, if the apparatus 1 is not present on the rail of the forward section in the running direction, the power is supplied to the power supply lines of the connecting rails and rotary rails to permit the apparatus 1 to come into the directioning apparatus, similar to the operation of the section control circuit. When the apparatus enters into the rotary rail 51, the relay R98 in the stopper control circuit 522 is energized to close its contact r98, thereby solenoids S1 and S2 are energized to cause the stoppers to prevent the apparatus 1 within the rotary rail from running out of the directioning apparatus. The phase of the power signal to the power supply lines in the rotary rail 51 may be inverted by either relay R96 or R97 in the phase inverter 254 depending upon the direction in which the apparatus 1 must be moved.

When the apparatus 1 reaches the center of the rotary rail 51, the detector 526 detects it and shuts off the power to the supply lines within the rotary rail 51, thereby the apparatus 1 is stopped within the rotary rail.

Then, the contact r87 is switched to the "directioning instruction device" side so that any of the relays R51 through R58 are energized to close any of the contacts r51 through r58. Thus, the coincidence in the coincident circuit 514 is lost through the relays R61 to R63 with its contacts r61 to r63, so that the rotary rail 51 is turned, similar to the case when the carrying apparatus approaches the turnable directioning apparatus.

When the rotary rail is aligned with the connecting rails, the power is supplied to the supply lines within the rotary rail of the directioning apparatus. Then the apparatus 1 runs out therefrom to a predetermined section. Thereafter, the rail of the directioning apparatus will return to its original angular position. The directioning instruction device 521 may be a selector or a shift register which will be described hereinafter.

Referring now to FIGS. 13C through 13G the logic for the direction finder and the circuit diagram of the direction finder are shown.

Figures 13C, 13D:
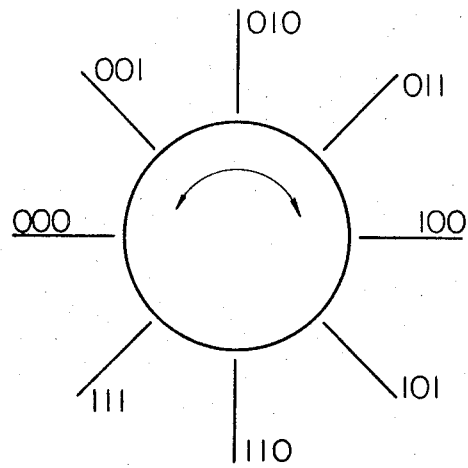

Referring particularly to FIG. 13C, the eight directions of the rotary rail may be represented by eight binary codes 000, 001, 010, 011, 100, 101, 110, 111, respectively. A clockwise turning or rotation of the rotary rail will be termed as "forward turn", and a counterclockwise turning thereof will be termed as "reverse turn" hereinafter.

Referring to FIG. 13D, the table shows, for all of the possible positions of the rotary rail, binary codes each of which equals to a binary signal representing the present position of the rail plus the complement of the binary signal represent a position to which the rotary rail is to be turned. Sign (−) indicates that there is a carry. The binary code 111 means that the rotary rail is in alignment with the desired connecting rail, so that directioning is not necessary. The hatched area means that a reverse turn is to be performed in order to take the shortest way within 180°, and the area without hatching means that a forward turn is to be performed for the same purpose. In view of the table of the binary codes, it can be seen that the code having "1" as its most significant digit signifies that a forward turn should be performed and that having "0" as its most significant digit signifies that a reverse turn should be performed. Accordingly, the direction of turning of the rotary rail may be determined by adding the binary code representing the present position of the rotary rail and the complement of the binary code representing the direction to which the rotary rail is to be turned and then by knowing whether its most significant digit is 1 or 0.

Figure 13E:
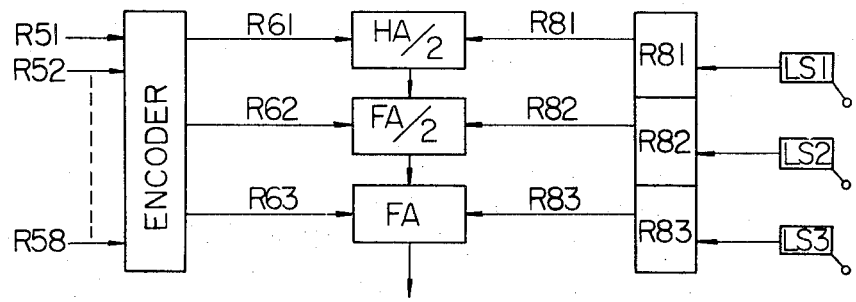
Figure 13G:
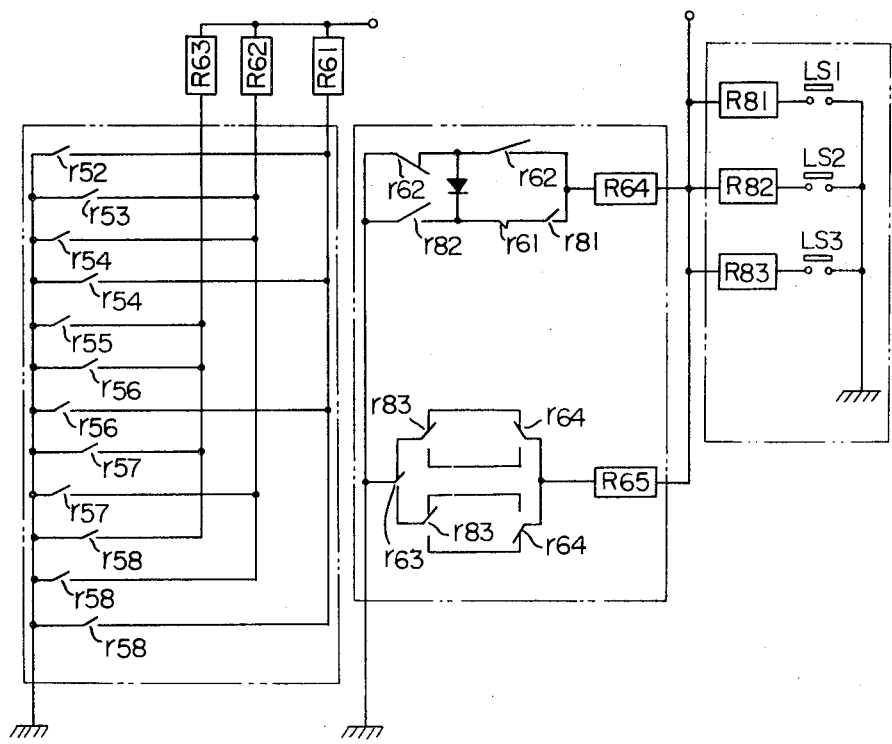

Referring to FIG. 13E, a block diagram of the logic circuit of the above determination of the direction is shown.

When the relays R51 through R58 and R61 through R63 are used for converting the directioning instruction to the binary code, the complement of the binary signal representing the position to which the rotary rail is to be turned is obtained. The relay R61 to R63 may normally be constituted by normally closed relays. The binary code representing the present position of the rail 51 may be obtained from the limit switch LS1 to LS3. The binary code representing the present position of the rail 51 is added to said complement representative signal. In executing such addition, only the most significant digit is necessary for the intended purpose, and the least significant digits and the second digits may not be necessary except when a carry to the most significant digit is produced. Thus, since the operation on the least significant digits may have a significance only in the case when a carry is produced, half of a half adder (HA/2) is sufficient, that is, a logical multiplication of the signals from the relays R61 and R81 is merely required to know the presence of a carry. Similarly, with respect to the second digit, since the significant signal is only that of a carry, half of a full adder (FA/2) is sufficient. With respect to the most significant digits, both the sum and the carry from the second digit are of significance, a full adder (FA) is required, but in this case the carry produced by the most significant digits is of no importance.

Referring to FIG. 13F, a logic circuit and its operation are illustrated. This operation may be done by a logic circuit shown in FIG. 13G which comprises relays R64 and R65. More particularly, this circuit may be connected to said motor M3 in such a manner that when the relay R65 is energized the rotary rail is turned forwardly, and when the relay R65 is deenergized the rotary rail is turned in the reverse direction.

With the above directioning apparatus, the branching operation in multidirections may be done by only one directioning apparatus.

RAIL

Figure 14A:
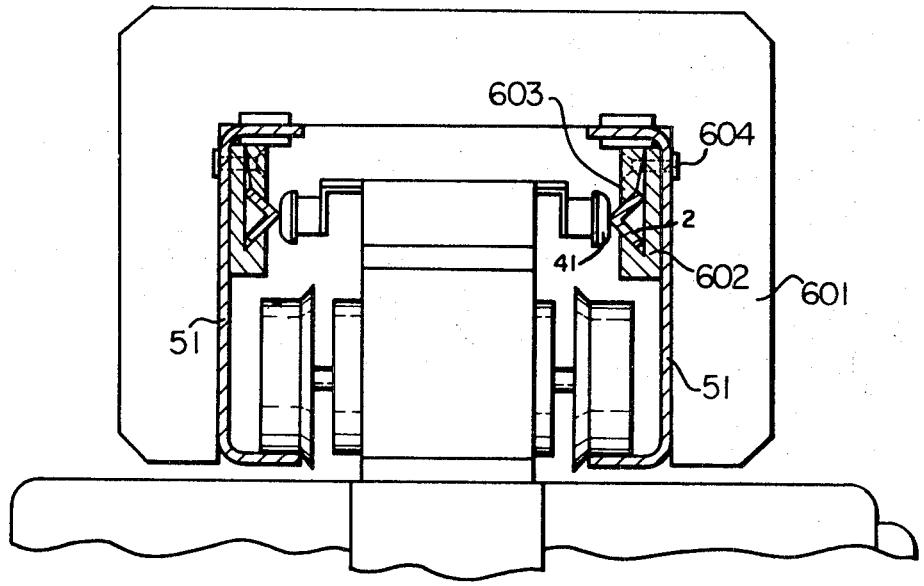
FIGS. 14A to 14C are views of embodiments of the rail.
Figure 14B:
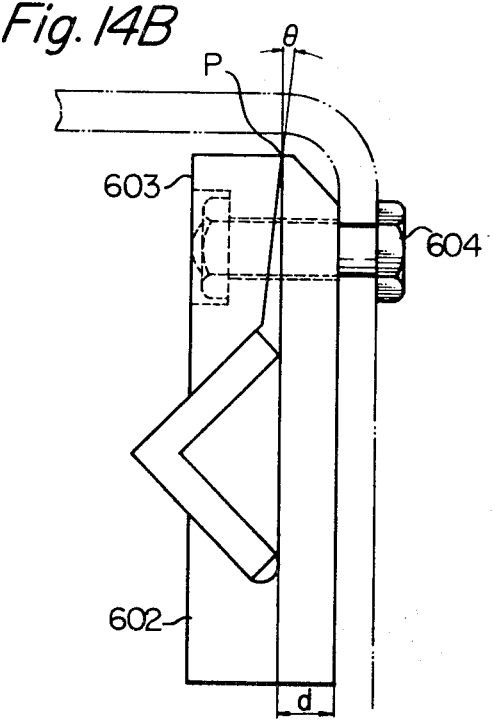

Referring now to FIGS. 14A and 14B, one embodiment of the rail used with the present system of this invention is shown.

This rail includes an inverted U-shaped frame 601, two U-shaped rails 51 mounted inside the frame on which the wheels 50 of the apparatus 1 run, insulating members 602 and 603 mounted on the upper inner surfaces of the rails 51, L-shaped power supply lines 2 inserted between the members 602 and 603, each of said members being secured to respective rails 51 by bolts or rivets 604.

Referring particularly to FIG. 14B, the member 602 having the thickness $d$ insulates the rail 51 from the power supply lines 2. The supply lines 2 supply the electric power to the apparatus 1 through the contact 41.

The electrically insulating member 602 has a portion which contacts with one of the outer surfaces of the L-shaped supply line 2. The electrically insulating member 603 contacts with the other outer surface of the supply line 2 and fixes it means of the bolt or rivet 604 so that the inner surface of the member 604 facing to the outer surface of the member 602 has an angle $\theta$ thereto as shown in FIG. 14B. A point P may be regarded as a pivot point of the insulating member 603.

Figure 14C:
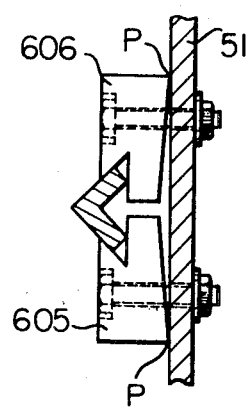

Referring to FIG. 14C, another embodiment of the rail is shown.

This rail structure includes two symmetrical L-shaped electrically insulating members 605 and 606 which support the power supply line 2 by contacting inner oblique surfaces thereof with the outer surface of the supply line 2 and by tightening them by means of two bolts or rivets so that the lower surfaces of the members facing the inner surface of the rail 51 have their pivot points P and make an angle with respect to the inner surface of the rail 51, respectively.

LIFTING AND LOWERING APPARATUS

Figure 15A:
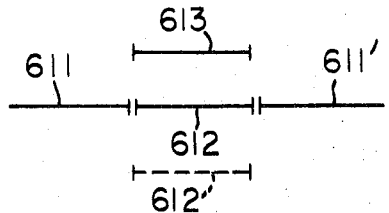
FIGS. 15A to 15B are views of an embodiment of the lifting and lowering apparatus.
Figure 15B:
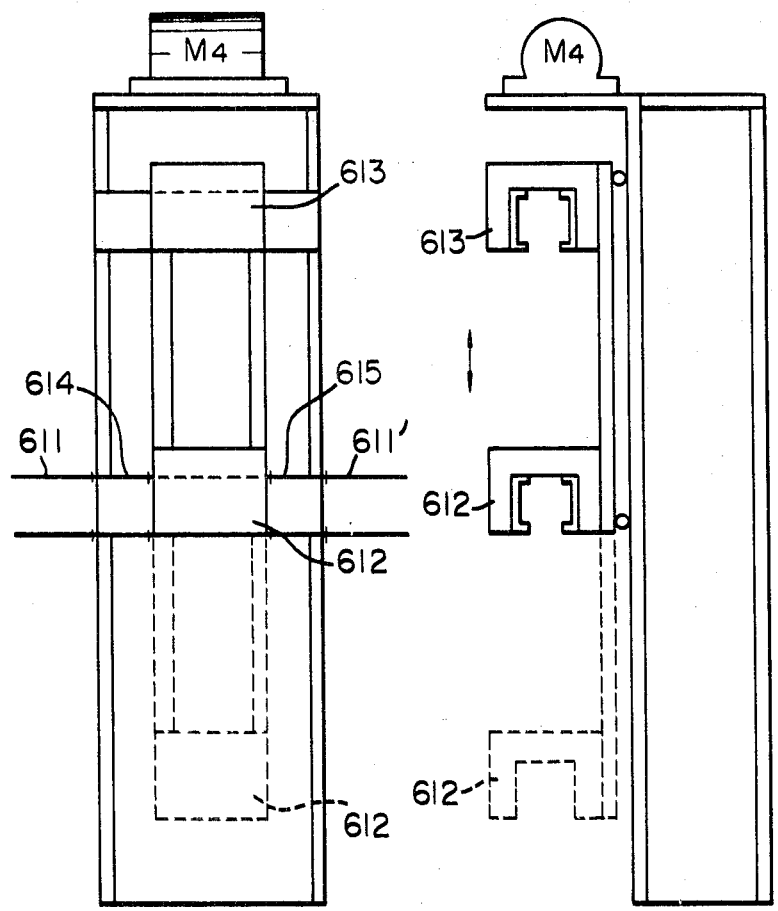

Referring now to FIGS. 15A and 15B, one example of a lifting and lowering apparatus of the apparatus 1 is shown.

Referring particularly to FIG. 15A, the principle of this apparatus is illustrated. The lifting and lowering apparatus includes fixed rails 611 and 611' on which the apparatus 1 runs, movable rail 612 positioned between the fixed rails. Also a similar rail 613 is provided above the rail 612 which is adapted to be lowered in an interlocked relation to the rail 612. More particularly, the rails 612 and 613 are interconnected with each other in such a manner that when the rail 613 is lowered to a position indicated by a broken line in FIG. 15A, the rail 613 is lowered to the position which was previously occupied by the rail 612. If it were not for the rail 613, the following carrying apparatus 1 coming along the rail 611 could not reach the rail 611' when the rail 612 is lowered. Thus, even while the carrying apparatus 1 on the rail 612 is lowered to permit the load on it to undergo a predetermined processing operation, the following apparatus 1 can pass this portion of the lifting and lowering apparatus.

Referring to FIG. 15B, a side and a front view of the lifting and lowering apparatus are shown diagrammatically.

Connecting rails 614 and 615 are secured respectively to the fixed rails 611 and 611', between which the movable rail 612 is disposed. The upper rail 613 is lowered or lifted together with the rail 612 for bypassing the following carrying apparatus when the rail is lowered. A drive motor M4 drives the rails 612, 613.

COLLECTOR

Figure 16:
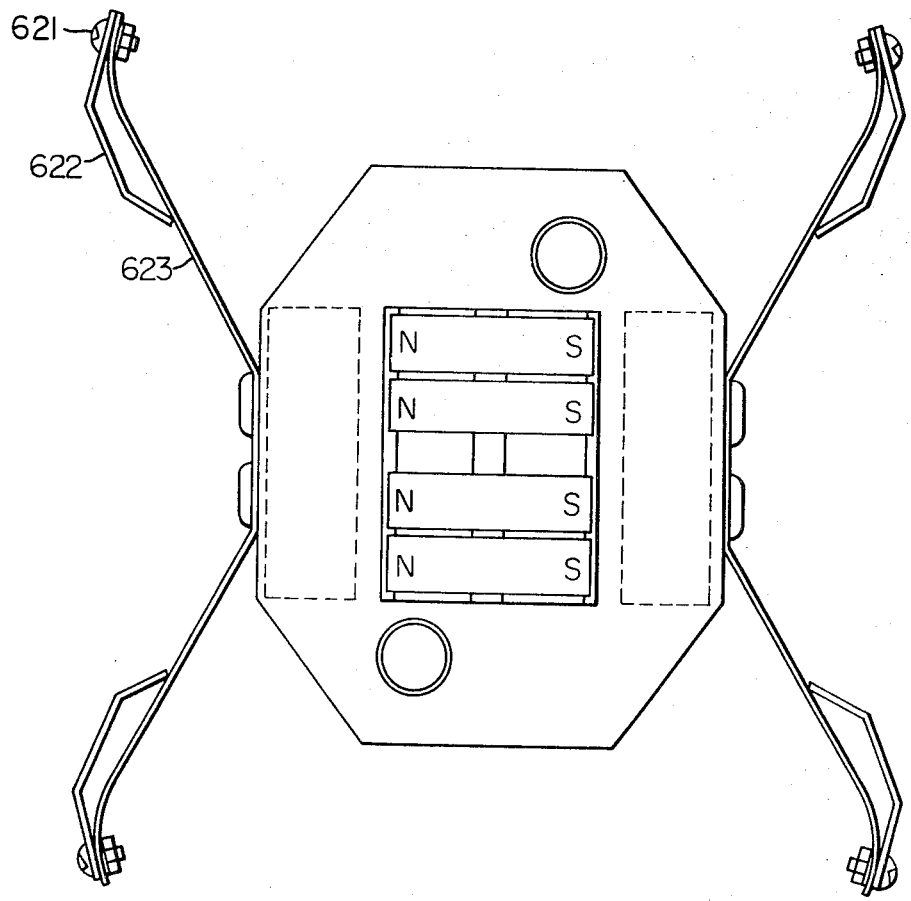
FIG. 16 is a view of an embodiment of the collector.

Referring now to FIG. 16, another embodiment of the collector of the apparatus 1 is shown.

This collector 40 receives the power signal for driving the apparatus 1 and a control signal superposed on it from the power supply lines 2 mounted within the rail. The collector includes permanent magnets buried in the head portion of a nonmagnetic baseplate of the apparatus 1. When the carrying apparatus 1 passes by the detector, such as reed relay, the detector detects it magnetically by means of the magnetic field produced by the magnets.

This collector 40 includes also arms 623 comprised of a plurality of sheets of leaf spring made of phosphorus bronze to increase resiliency and contacts 622 mounted at the end of the arms 623, the arms being symmetrically mounted on both sides of the head of the apparatus 1 so as to face to and contact with the power supply lines 2 at their ends. The contacts 622 being made of stainless steel and its end being fixed to the end of the arm by bolt 621. Thus, the vibration and bounding of the arms 623 caused by the unevenness of the surface of the supply lines 2, such as a seam thereof, is reduced to eliminate electric arcs as well as noise while maintaining high durability of the supply lines.

SELECTOR

Referring to FIGS. 17A to 17D, a principle and schematic wiring diagram of the selector are shown.

This selector is sued by selecting the operation of the carrying apparatus 1 in the branching apparatus or the directioning apparatus.

Figure 17A:
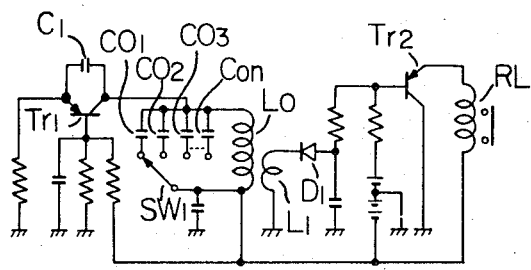
FIGS. 17A to 17D are wiring diagrams of an embodiment of the selector used with this system.

Referring particularly to FIG. 17A, the selector includes a transistor Tr1, an oscillating circuit having a tank circuit composed of coil LO and capacitors CO (CO1 to COn) connected in the collector circuit of the Tr1, coil L1 electromagnetically connected to the coil LO, diode D1 functioning as a rectifier, a transistor Tr2 for receiving the output of the rectifier to control itself, a relay RL energized by the output of the transistor Tr2, and a switch SW1 adapted to be switched between capacitors CO to produce n frequencies $f1, f2.....fn$.

Figure 17B:
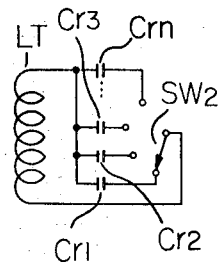

Referring to FIG. 17B, one example of tank circuit comprised of coil LT and capacitors Cr (Cr1, Cr2, ...Crn) is shown. A switch SW2 is switched between the capacitor Cr to produce $n$ of turned frequencies $f1, f2, ..fn$.

Figure 17C:
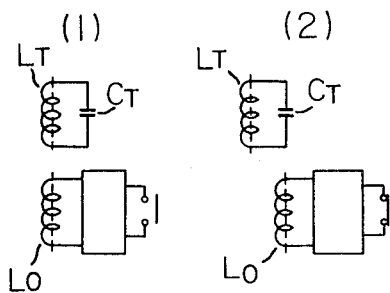

Referring to FIG. 17C(1), when the tank circuit approaches the oscillating circuit as shown in FIG. 17A, if the oscillating frequency is the same as the resonant frequency, the oscillating energy is absorbed in the resonant circuit so that its oscillating will stop, thereby the output of the rectifier will not be present so that the relay RL is deenergized. Accordingly, as shown in FIG. 17C(2), the absorbing phenomena of the oscillating circuit will stop to energize the relay again.

By utilizing the above phenomena, the branching or directioning may be done as follows. For example, if the oscillating frequency of the selector at the branching apparatus or that at the directioning apparatus is predetermined to have a selected value for each direction, and if a resonant circuit is provided in the carrying apparatus 1 and its resonant frequency is set so as to correspond with one of said oscillating frequencies, the carrying apparatus, when it reaches the branching apparatus or the directioning apparatus, will be branched or directed to the direction indicated by the frequency at which said resonant frequency has been set. Thus, the instruction to the carrying apparatus 1 can take the form of a frequency given to said oscillating circuit.

In FIG. 17A, the capacitance of the capacitor C1 may be smaller so that it has the function of a magnetic detector type noncontact switch.

Figure 17D:
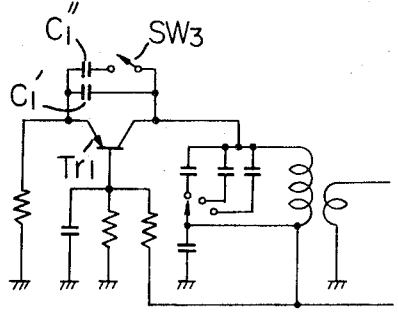

Referring now to FIG. 17D, if the capacitor C1 is divided into capacitors C1', C1'' so that the switch is connected thereto, it may be used as magnetic detector.

SHIFT REGISTER

Figure 18A:
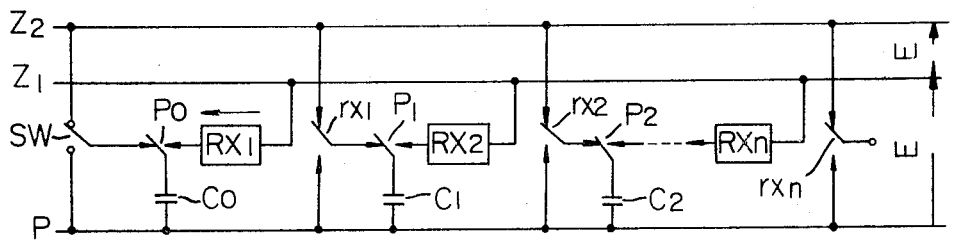
FIGS. 18A to 18C are wiring diagrams of an embodiment of the shift register used by this system.
Figure 18B:
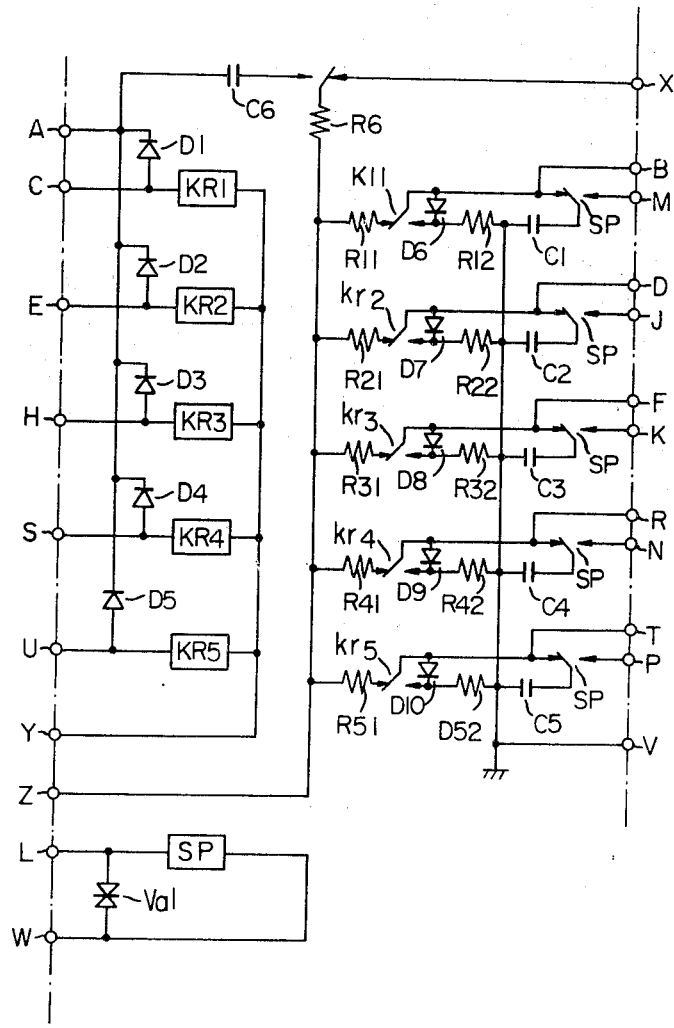
Figure 18C:
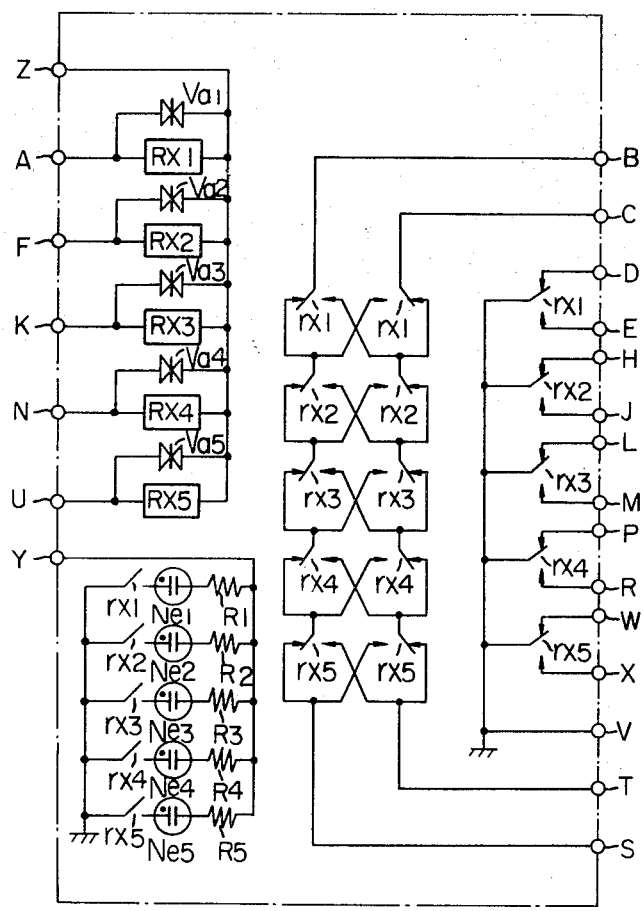

In FIGS. 18A to 18C there are illustrated a principle and schematic diagram of the shift register which may be used as the aforementioned directioning instruction device 52' for controlling the operation of the turntable directioning apparatus.

Hitherto, a two coil type bistable reed relay has been used in which its contact arm is switched to one stable position when one coil is energized in one direction and the same contact arm is switched to the other stable position when the other coil is energized in the other direction. The shift register used in this application uses a single coil type bistable reed relay in which the single coil of a register stage is energized in either direction so that either of binary signals "1" or "0" is transferred to the next register stage. The shift register according to prior art comprises a first relay included in a first section which is activated by the signal from the immediately preceding stage, and a second relay included in a second section which serves to transmit the signal to be sent to the next stage. In the shift register according to this application, the signal to be sent to the next stage is stored in a capacitor, and the single relay included in one register stage functions to enter the signal from the preceding stage into the capacitor. Thus, this arrangement permits the reduction of the number of relays needed while utilizing a common line and a drive line for each bit to energize the single relay included in one register stage. Thus, the reliability of the circuit is improved and the positive and economic operation thereof may be obtained.

Referring particularly to FIG. 18A, the coils RX1, RX2...RXn are bistable reed relay coils, and their contacts are designated by $rx1, rx2, ...rxn$. Contacts P0, P1...Pn-1 serve to shift the binary signals and they can be operated sequentially or simultaneously. Capacitors C1, C2....Cn store the signals in the form of an electric charge for energizing the relays of the following stages.

It may be supposed that the potential on line Z1 is −E volts relative to the ground, P, and that one line Z2 is −2E volts.

In this circuit, the signal may be set by a switch arm of a switch SW. Further, it may be supposed that when the switch arm is connected to the line Z2 the signal is termed to be 0, and when the switch arm is connnected to ground the signal is termed to be 1. When "0" signal is set by the switch SW the capacitor C0 is charged to −2E volts relative to the ground. When the contact P0 is switched, the charge in the capacitor C0 causes a current to flow through the coil RX1 as indicated by an arrow, so that its contact $rx1$ is closed at its upper side, as shown in FIG. 18A and thereafter the contacts P1, P2, ...are operated in this sequence until all of the coils RX1, RX2,...RXn become "0."

When the switch SW is transferred to "1" position, the capacitor C0 is discharged and when the contact P0 is switched to the position opposite to that shown in FIG. 18A, the capacitor C0 is charged so that the current flows through the coil RX1 in the direction opposite to that indicated by the arrow, thereby its contact $rx1$ is closed at its lower side. Thus, the coil TX1 becomes "1", and when the contacts P1, P2...Pn are operated sequentially the signal "1" is shifted.

Referring to FIG. 18B, a schematic wiring diagram of one example of the shift register is shown, which is assembled on one printed circuit and can be used for five parallel bits.

KR1, KR2,...KR5 designate bistable reed relay coils. Diodes D1, D2,... D5, are used for resetting the bistable reed relays to "0." Relay SP is used for shifting the stages of the reed relays KR1, DR2, ...DR5 to the next stage when they receive the shift pulse. Resistors R11, R21...R51, R12, R22... R52 are used for preventing excess current from flowing from the capacitors C1, C2, ...C5 when the capacitors discharge. Diodes D6, D7,...D10 are used as suppressors for protecting the contacts of the reed relays DR. Capacitors C1, C2, 111C5 are used for transmitting the signal. When all are operated simultaneously by a shift pulse, the state of the present stage becomes the same as that of the immediately preceding stage since the signal from the immediately preceding stage enters into the coils KR every time when the shift signal enters. When the shift pulse enters separately to the respective stage, even if the signal is transferred to the next stage when the next shifting of the signal is executed in a certain stage, the signal content in said certain stage does not change. When a shift signal is applied to reset said certain stage, − 2E volts is applied through a resistor R6, contact SP, capacitor C6 to the coils KR so that the coils KR1 through KR5 are reset.

In order to read the state of the register in this shift register, a separate buffer relay is operated by the signals from the terminals B, D, F, R and T.

Referring to FIG. 18C, one embodiment of said buffer relay is shown.

When the relays RX1, RX2,...RX5 receive the signal terminals B, D, F, R and T, neon tubes Ne1, Ne2,...Ne5 indicate the state of each bit. The circuit between the terminals B and S and the circuit between the terminals C and T are used for parity check. The output of the buffer circuit is extracted by means of the contacts $rx1, rx2,...rx5$.

SHORT CIRCUIT PROTECTION DEVICE

Figure 19A:
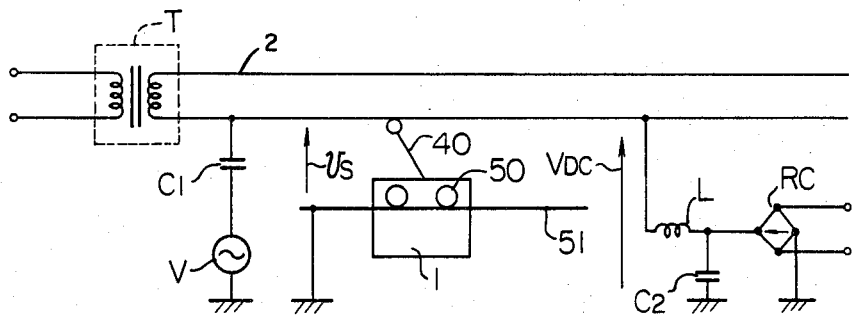
FIGS. 19A to 19B are schematic diagrams of the short circuit protection device used with this system.
Figure 19B:
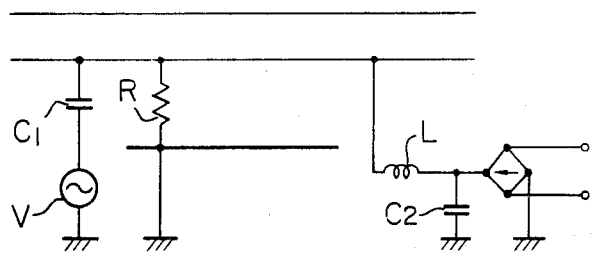

Referring now to FIGS. 19A and 19B, a short circuit protection device for the control signal circuit used in this system is shown.

In FIG. 19A, the relationship between the supply lines 2 and the apparatus 1 is shown. A control signal generator V is grounded at one end and is connected through a capacitor C1 to the power supply line 2 at the other end for supplying the control signal to the supply lines 2. The power is supplied through the transformer T to the supply lines 2. This transformer T provides a large impedance between the supply line 2 and ground so that it separates the power supply lines 2 from the ground.

The rail 51 for the apparatus 1 to run is grounded, and one end of the receiving section of the apparatus 1 is connected through the rotary wheels 50 and the rails 51 to the ground. The collector 40 receives the power signal and control signal from the supply lines 2 and gives them to the apparatus 1. Assume that the amplitude of the control signal relative to the ground is "Vs". This control signal is received by the receiving section of the apparatus 1. The ground, the supply lines 2 and the rail 51 do not form a closed circuit in terms of direct current.

One end of the DC power output of the rectifier RC is grounded, and the other end thereof is connected through a capacitor C2 and a choke coil L having small DC resistance to the supply lines 2. This filter circuit consisting of the choke coil L and capacitor C2 has large impedance to the control signal Vs applied to the supply lines 2, accordingly the control signal is not affected thereby. Since the circuit between the supply lines 2, the ground and the collector 40 do not form a closed loop, the direct current power VE is applied between the supply lines 2 and the rail 51.

Referring now to FIG. 19B, an equivalent electric circuit of the arrangement shown in FIG. 19A is shown.

Let us suppose that the power supply lines 2 are grounded by conductive chips, such as scraped particles from the supply lines and rail resulting from friction therebetween and that R shows a resistance equivalent to the resistance of such a chip. The value of R is very small. Accordingly, in effect, the power supply lines 2 are grounded, and as a result the amplitude Vs of the control signal becomes zero and the apparatus 1 can no longer be controlled. However, the short circuit current flows between the lines 2 and rail 51 through the resistance R. This current is very large so that said chip will be burnt momentarily, thereby the DC current path between the rail and the power supply line will be broken momentarily. Thus, the carrying apparatus 1 can be again controlled by the control signal Vs. In this way, with the arrangement shown in FIG. 19 the intended short circuit protection effect can be obtained.

BOOSTER

Figure 20A:
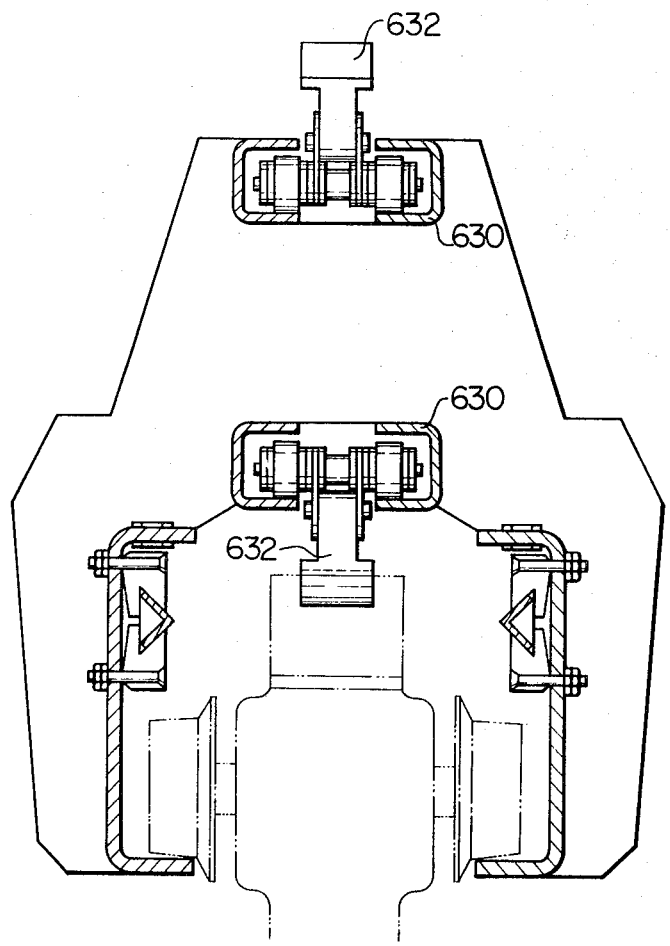
FIGS. 20A to 20C are views of an embodiment of the booster.
Figure 20B:
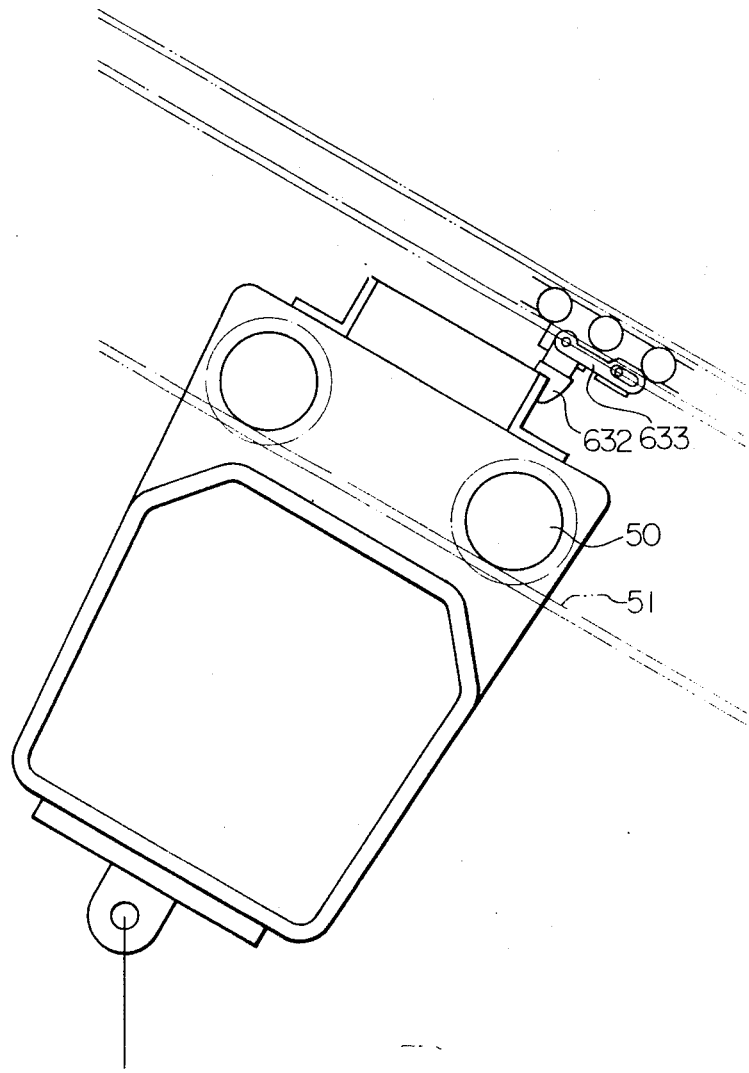
Figure 20C:
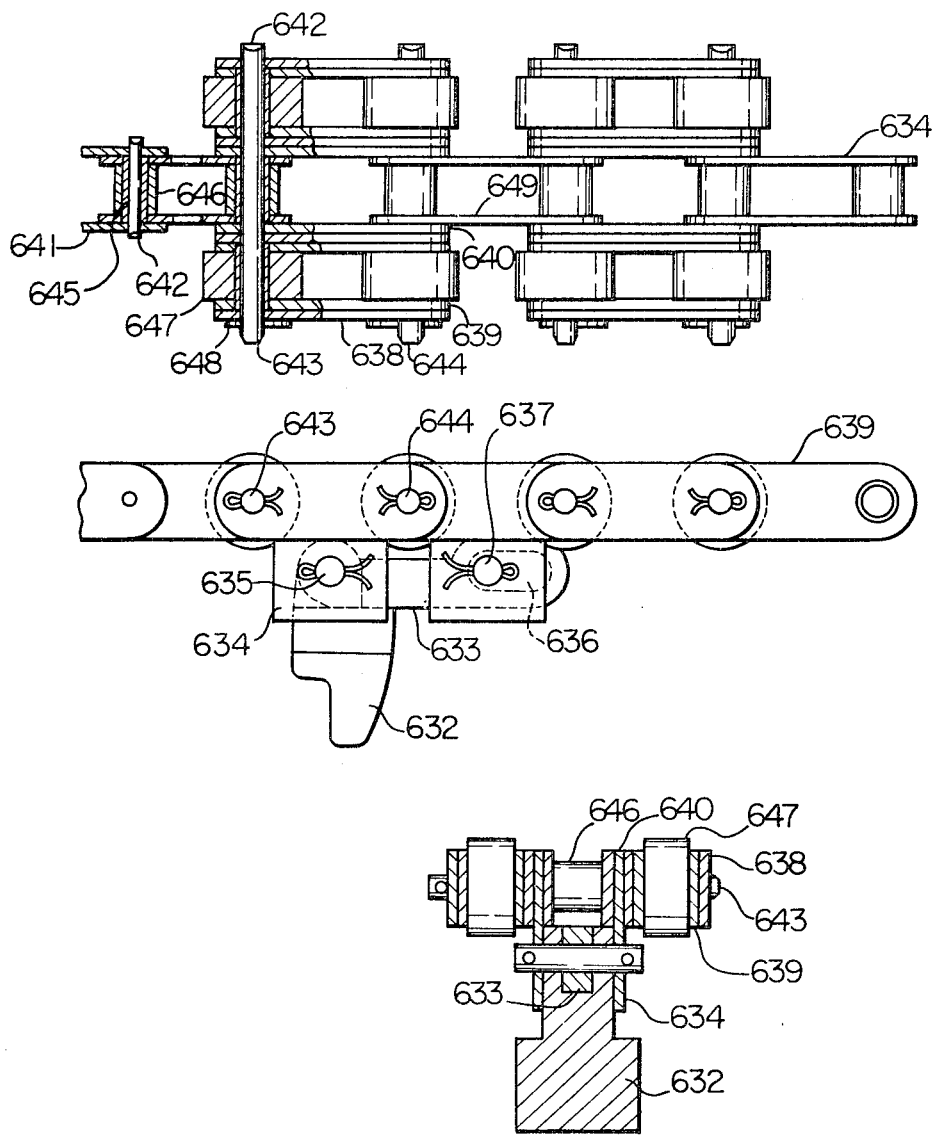

Referring now to FIGS. 20A to 20C, one example of the booster used in this system is shown.

As shown in FIG. 20A, at the upper portion of the rail 51, a chain rail 630 is provided so that it is driven by a suitable power. The boosters may be provided at any place of the chain rail 630 so that they urge the apparatus 1 while it is running along an ascent and brake it while it is running along a descent for stable operation of the apparatus 1.

Referring now to FIG. 20B, a pusher 632 of the chain holds one portion of the apparatus 1 to prevent the backward rotary wheel 50 from being disengaged upwardly from the rail 51, and a link bar 633 secured to the pusher 632 is connected to the chain rollers driven within the chain rail 630.

Referring to FIG. 20C, and explanatory structure of the booster is shown.

The pusher 632 is secured by a pin 635 to a link plate 634 together with the link bar 633, and one end of the link bar 633 has a slot 636 therein so that link bar 633 is secured by a pin 637.

This pusher has such a structure that the supporting moment thereof is divided into two parts which are shared by two chain rollers by lengthening the length of the link bar to two times that of the prior pusher dog, so that when the link bar contacts the sprocket of the chain, it may bend due to the slot. This pusher 632 can stand against the force from the left in FIG. 20C but it cannot stand against the force from the right since it is rotated about the pin when the force is applied thereto from the right.

In order not to allow the apparatus 1 to slip while it is running along a descent, the running speed of the apparatus 1 may preferably be less than that of the chain of the booster. When this booster is to be used on a descent the apparatus 1 may be hooked by the pusher before it reaches the descent, and upon arrival of the apparatus 1 at the descent, it may descent while it is supported by the pusher 632.

With the above system, the load hung from the apparatus 1 may be transported automatically from a predetermined place to a predetermined location at a predetermined speed while undergoing various continuous or intermittent treatments at any time required on its way.

Further, in carrying a load or loads, stopping, starting, changing running speed, branching, joining, changing running direction of the carrying apparatus 1 may be carried out easily without disturbing the operation of the immediately preceding or succeeding apparatus on the way, such as by bypassing it around the present carrying apparatus by means of the branching and joining apparatus, the lifting and lowering device, the turnable directioning apparatus, etc.

Also, feeding of the control signal or instruction signal to the apparatus 1 may be done very easily and simply, so that the operation of the apparatus 1 may be controlled easily and optionally.

We claim:

1. An automatic carrying system comprising:
   rail means divided into a plurality of sections each having a segment of power supply line provided therein and extending therealong;
   at least one automatic carrying apparatus movable along said rail means and having wheels driven by an electrically operated mover and including various instruction detectors;
   a plurality of instruction devices disposed at predetermined positions along said rail means for individually applying various instructions to said instruction detectors of said automatic carrying apparatus when said automatic carrying apparatus approaches any of said instruction devices, in order to control automatically starting and stopping, and speed and direction of movement of said automatic carrying apparatus; and
   a plurality of section control devices coupled respectively to said segments of power supply lines of said rail sections, each of said section control devices being assembled as a unit, and
   each of said section control units comprising: a first, second, third, fourth, fifth, sixth and seventh terminal members, said third terminal member being connected to the segment of power supply line of the associated rail section, said seventh terminal member being connected to a source of electric power; a detector provided at the entry end of the associated section; a first relay means responsive to said detector and including a normally open switch having its one contact connected to the ground and a single-pole double-throw switch having its stationary contacts connected respectively to said first and second terminal members and having its movable contact normally connected electrically to said second terminal; a second relay means including a normally closed switch having its stationary contact connected to the movable contact of said single-pole double-throw switch of said first relay means and having its movable contact connected to the ground, said second relay means having a first input adapted, when grounded, to open said normally closed switch of said second relay means and a second input adapted, when grounded, to return said switch of said second relay means to the closed state; time delay means having one end connected to said first input of said second relay means and the other end connected to the other contact of said normally open switch of said first relay means, said second input of said second relay means being connected to said fifth terminal member; and a third relay means including a second single-pole double-throw switch having its stationary contacts connected respectively to said third and fourth terminal members and having its movable contact which is connected at its one end to said seventh terminal member and has the other rockable end which is connected electrically to said third terminal member when said third relay means is in energized condition, and said third relay means being adapted to be energized when said sixth terminal member is grounded;
   said section control units being connected in a consecutive fashion, and the first and second terminal members of each section control unit being connected respectively to the fifth and sixth terminal members of the section control unit associated with the immediately preceding rail section, so that said sixth terminal member of any section control unit is normally grounded to keep the third relay means of that section control unit energized thereby to supply electric power to the segment of power supply line of the associated rail section, whereby when the automatic carrying apparatus enters from a first rail section to an adjacent second rail section, supply of electric power to the segment of power supply line of said first rail section is automatically switched off, and when the automatic carrying apparatus further proceeds from the second rail section into a next adjacent third rail section, supply of electric power to the segment of power supply line of said second rail section is automatically switched off while supply of electric power to the segment of said first rail section is automatically switched on.

2. An automatic carrying system according to claim 1 wherein each of said section control units has a capacitor having a capacitance large enough to store sufficient electric charge to actuate said first and second relay means and adapted to discharge its electric charge through a predetermined time period upon failure of the main power supply, whereby even if supply of electric power is switched on after failure of the main power supply while the automatic carrying apparatus is forced to enter from the first rail section to the second rail section due to its inertia, said first and second relay means are actuated so as to insure that electric power is not supplied to the segment of power supply line of said first rail section so long as the second input of said second relay means associated with said second rail section is not activated.

3. An automatic carrying system according to claim 1 wherein each of said section control units further comprises a low-speed instruction device for supplying an instruction to reduce the speed of the automatic carrying apparatus when it passes over the low-speed instruction device, the low-speed instruction device of the section control unit associated with a first rail section being connected to the fourth terminal member of the section control unit associated with a next succeeding second rail section, whereby, when the automatic carrying apparatus approaches the low-speed instruction device belonging to the first rail section, the speed thereof is reduced so that it can be stopped smoothly or with less shock when it runs into said second rail section.

* * * * *